US005998035A

United States Patent [19]

Iwamura et al.

[11] Patent Number: 5,998,035

[45] Date of Patent: Dec. 7, 1999

[54] METHOD FOR FORMING COATING AND BASE COATING PAINT USED THEREFOR

[75] Inventors: Goro Iwamura, Sakai; Shigeki Matsui; Norio Kosaka, both of Izumi-Otsu; Yoshiaki Marutani, Hiroshima; Kazuhi Koga, Hiroshima; Mika Ohsawa, Hiroshima; Hiroshi Kubota, Hiroshima-ken, all of Japan

[73] Assignees: Mazda Motor Corporation, Hiroshima, Japan; Dainippon Ink and Chemicals, Incorporated, Tokyo, Japan

[21] Appl. No.: 08/989,021

[22] Filed: Dec. 11, 1997

Related U.S. Application Data

[62] Division of application No. 08/623,050, Mar. 28, 1996, Pat. No. 5,721,015.

[51] Int. Cl.[6] .............................. B32B 27/00; B32B 27/40

[52] U.S. Cl. .................................... 428/423.1; 428/425.3; 428/460; 427/407.1; 427/412.1

[58] Field of Search .............................. 428/423.1, 425.3, 428/460; 427/407.1, 412.1

[56] References Cited

U.S. PATENT DOCUMENTS

| | | |
|---|---|---|
| 3,907,623 | 9/1975 | Dowbenko . |
| 3,958,050 | 5/1976 | Stauner et al. . |
| 3,959,201 | 5/1976 | Chang . |
| 4,076,676 | 2/1978 | Sommerfeld . |
| 4,403,003 | 9/1983 | Backhouse . |
| 4,469,841 | 9/1984 | Hart et al. . |
| 4,650,718 | 3/1987 | Simpson et al. . |
| 4,933,213 | 6/1990 | Fourquier et al. . |
| 5,225,248 | 7/1993 | Stephenson . |
| 5,283,084 | 2/1994 | Lau . |
| 5,510,148 | 4/1996 | Taljan et al. . |
| 5,565,243 | 10/1996 | Mauer et al. . |

FOREIGN PATENT DOCUMENTS

| | | |
|---|---|---|
| 2-21422 | 1/1990 | Japan . |
| 4-45869 | 2/1992 | Japan . |
| 2218925 | 11/1989 | United Kingdom . |

*Primary Examiner*—Duc Truong
*Attorney, Agent, or Firm*—Martin Fleit

[57] ABSTRACT

A coating method is disclosed, which comprises coating a base coating paint on a substrate, coating thereon a clear coating paint of a curing system different from that of the base coating paint in a wet-on-wet state, and then baking the resultant coatings, wherein a curing catalyst for curing the clear coating paint is incorporated into the base coating paint and wherein the curing catalyst has a boiling point of 150° C. or higher under 760 mmHg. The base coating paint comprising such a curing catalyst is also disclosed.

12 Claims, No Drawings

METHOD FOR FORMING COATING AND BASE COATING PAINT USED THEREFOR

This application is a divisional of application Ser. No. 08/623,050, filed Mar. 28, 1996, now U.S. Pat. No. 5,721,015.

TITLE OF THE INVENTION

Method for Forming Coating and Base Coating Paint Used Therefor

BACKGROUND OF THE INVENTION

The present invention relates to a method for coating a base coating (or base coat) paint and clear coating (or clear coat) paintto, particularly, motor cars by a wet-on-wet technique, and a base coating paint used therefor. In particular, the present invention relates to a coating method capable of remarkably improving the coating workability, and a base coating paint used therefor.

Recently, various curing systems for clear coating paints have been proposed. They include, for example, curing systems containing a hydroxyl group (including a blocked hydroxyl group), a carboxyl group (including a blocked carboxyl group wherein the hydroxyl group of the carboxyl group is blocked), a phosphoric acid group (including a blocked phosphoric acid group wherein the hydroxyl group of the phosphoric acid group is blocked) or an acid anhydride group; curing systems containing such a group as described above and also a silyl group (including a hydrolyzable silyl group blocked with a hydrolyzable group) and/or an epoxy group; curing systems containing an acetoacetyl group and a vinyl ether group or a vinyl thioether group (hereinafter referred to simply as a vinyl (thio)ether group); curing systems containing a vinyl (thio) ether group and a carboxyl group or a silyl group; curing systems containing an alicyclic epoxy group and a silyl group; and curing systems containing a silyl group or an alicyclic epoxy group singly. In such curing systems, a curing catalyst is usually used so as to accelerate the curing reaction of the functional groups.

In the wet-on-wet technique, the clear coating paint and the base coating paint are separately stored in storage vessels until immediately before the coating thereof, and these paints are separately transferred to a coating apparatus such as a nozzle or spraying means for the wet-on-wet coating. However, as the strage time of a clear coating paint comprising a functional group-containing oligomer or polymer (hereinafter referred to as "oligomer" collectively) and also the curing catalyst becomes longer, the clear coating paint begins to cure in the presence of such a curing catalyst and gradually thickened before the wet-on-wet coating is carried out. Therefore, when two or more kinds of functional groups are involved, the oligomers having different groups must be separated from each other and also when the curing catalyst is to be incorporated, it should be incorporated into only one kind of the oligomer to prevent the curing reaction. Even when an oligomer having only one kind of a functional group is used, it must be separated from the curing catalyst to prevent the curing reaction. When the paint is stored in the form of two or more liquids and they are mixed together immediately before the wet-on-wet coating is carried out, the flow rate and amount of each liquid must be controlled to prepare the clear coating paint, which makes the mixing device complicated and, therefore, makes the cost high for the apparatus.

SUMMARY OF THE INVENTION

After intensive investigations made for the purpose of developing a paint having an excellent storability and free from thickening and capable of being coated by the wet-on-wet technique by ordinary coating steps without changing the apparatus, the inventors have reached the present invention.

Namely, the inventors have found that the object of the invention can be surely attained by a coating method comprising coating a base coating paint containing a hydroxyl group-containing oligomer and an aminoplast resin to a substrate, coating thereon a clear coating paint of a curing system different from that of the base coating paint in a wet-on-wet state and then baking the coatings, wherein the curing catalyst for the clear coating paint is incorporated, not into the clear coating paint, but into the base coating paint. The present invention has been completed on the basis of such a new finding.

Namely, the present invention relates:

1. a coating method which comprises coating, on a substrate, a base coating paint containing a hydroxyl group-containing oligomer and an aminoplast resin to a substrate, coating thereon a clear coating paint of a curing system different from that of the base coating paint in a wet-on-wet state, and then baking the resultant coatings, wherein a curing catalyst for the clear coating paint is incorporated into the base coating paint, and wherein the boiling point of the curing catalyst is 150° C. or higher under 760 mmHg; and
2. a base coating paint which is coated on a substrate and after which a clear coating paint of a curing system different from that of the base coating paint is coated thereon in a wet-on-wert state, the base coating paint comprising a hydroxyl group-containing oligomer and an aminoplast resin, and a curing catalyst for a clear coating paint of a curing system different from that of the base coating paint, the curing catalyst having a boiling point of 150° C. or higher under 760 mmHg.

DESCRIPTION OF THE PREFERRED EMBODIMENTS

The base coating paint used in the present invention comprises a hydroxyl group-containing oligomer, an aminoplast resin and a curing catalyst to be used in a clear coating paint of a curing system different from that of the base coating paint and to be coated on the base coating formed by the base coating paint by the wet-on-wet method.

The hydroxyl group-containing oligomer is not particularly limited and those containing a hydroxyl group such as polyester oligomers and vinyl oligomers are usable. Among them, vinyl oligomers are excellent from the viewpoint of the weather resistance. The hydroxyl group-containing polyester oligomers include well known polyester oligomers obtained by condensation reaction or addition reaction of various combinations of polyhydric alcohols or polyepoxy compounds, acid anhydrides, monobasic acids or fatty acids, polybasic acids, monoepoxy compounds, lactone or hydroxyl group-containing monocarboxylic acids.

The polyhydric alcohols (polyols) used for the above-described reaction include diols, triols, tetraols, pentaols and hexaols. The diols include, for example, ethylene glycol, propylene glycol, 1,5-pentanediol, 1,4-pentanediol and 1,6-hexanediol. The triols include, for example, glycerol, trimethylolethane, trimethylolpropane, trishydroxymethylaminomethane and 1,2,6-hexanetriol. The tetraols include, for example, pentaerythritol, diglycerol, lyxose and sorbitol. The pentaols include, for example, mannose. The hexaols include, for example, inositol. From the viewpoint of easiness of the synthesis, triols and tetraols are preferably used.

The polyepoxy compounds having 3 to 6 or more epoxy groups in the molecule include, for example, trisglycidyl isocyanurate, trisglycidylpropyl isocyanurate, tetraglycidylmethaxylenediamine, tetraglycidyl-1,3-bisaminomethylcyclohexane, tetraglycidyldiaminodiphenylmethane, triglycidyl-p-aminophenol and diglycidylaniline.

The acid anhydrides include, for example, phthalic anhydride; alkylphthalic anhydrides such as 4-methylphthalic anhydride; hexahydrophthalic anhydride; alkylhexahydrophthalic anhydrides such as 3-methylhexahydrophthalic anhydride and 4-methylhexahydrophthalic anhydride; succinic anhydride; and tetrahydrophthalic anhydride. From the viewpoint of the weather resistance, benzene ring-free hexahydrophthalic anhydride, alkylhexahydrophthalic anhydrides and succinic anhydride are preferred.

The monobasic acids and aliphatic acids are preferably aliphatic acids having 4 to 22 carbon atoms, more preferably 4 to 15 carbon atoms. The fatty acids include, for example, butanoic, pentanoic, hexanoic, heptanoic, octanoic, nonanoic, decanoic, undecanoic, dodecanoic, tridecanoic, tetradecanoic, pentadecanoic, hexadecanoic and heptadecanoic acids.

The polybasic acids include, for example, phthalic, hexahydrophthalic, alkylhexahydrophthalic, alkylphthalic, adipic, sebacic, itaconic and trimellitic acids as well as trimellitic anhydride.

As the monoepoxy compounds, aliphatic hydrocarbon epoxides having an unsaturated bond, particularly α-olefin epoxides, glycidyl ethers and glycidyl esters, are preferably usable. The α-olefin epoxides are preferably those having 3 to 25 carbon atoms such as propylene oxide, AOEX 24 (a mixture of α-olefin epoxides having 12 and 14 carbon atoms) and AOEX 68 (a mixture of α-olefin epoxides having 16 and 18 carbon atoms) (both AOEX 24 and 68 are products of Daicel Chemical Industries, Ltd.). The glycidyl ethers include, for example, butyl glycidyl ether, phenyl glycidyl ether, decyl glycidyl ether and cresyl glycidyl ether. The glycidyl esters include, for example, Cardura E-10 and PES 10 (products of Yuka Shell Epoxy K.K.).

The number of carbon atoms in the monoepoxy compound is preferably 4 to 22 from the viewpoints of easiness of the synthesis thereof and the properties of the coating obtained therefrom. Particularly preferred number of carbon atoms in the monoepoxy compound is 4 to 15.

The hydroxyl group-containing monoepoxy compounds are the above-described monoepoxy compounds into which a hydroxyl group has been incorporated. They are, for example, 1,2-epoxyhexanol, 1,2-epoxyoctanol, 1,2-epoxydecanol, hydroxybutyl glycidyl ether, hydroxyoctyl glycidyl ether, hydroxyphenyl glycidyl ether, hydroxybutyl glycidyl ester and hydroxycyclohexyl glycidyl ester.

Further, a combination of the monoepoxy compound and the hydroxyl group-containing monoepoxy compound is also usable. For example, a mixture of a monoepoxy compound having an aliphatic hydrocarbon group having 4 to 22 carbon atoms with a hydroxyl group-containing monoepoxy compound which may or may not have such an aliphatic hydrocarbon group is usable.

The hydroxyl group-containing monoepoxy compounds include those having 3 to 15 carbon atoms. A preferred example of them is glycidol.

The lactones include, for example, ε-caprolactone, β-propiolactone, γ-butyrolactone and δ-valorolactone. From the viewpoint of easiness of the synthesis, preferred lactone is ε-caprolactone.

The hydroxy acids are not particularly limited so far as they contain both a hydroxyl group and a carboxyl group in the molecule. Preferred examples of the hydroxy acids include linear or branched hydroxyalkanoic acids such as pivalic acid and 12-hydroxystearic acid, and reaction products obtained by reacting a polyol with a compound having an acid anhydride group. The polyols used for this purpose include, for example, diols such as ethylene glycol, propylene glycol, 1,5-hexanediol, 1,6-hexanediol, neopentyl glycol and cyclohexanedimethanol; trihydric alcohols such as trimethylolpropane, trimethylolethane and glycerol; and tetrahydric alcohols such as pentaerythritol and diglycerol. The compounds having an acid anhydride group are preferably the above-described acid anhydrides.

The reaction for forming the polyester oligomer is conducted under well-known esterification reaction conditions.

The synthesis reaction can be conducted in the presence of a catalyst for accelerating the reaction of the lactone, a catalyst for accelerating the reaction of the hydroxyl group with the carboxyl group, or a catalyst for accelerating the reaction of the carboxyl group with the epoxy group. The catalysts for accelerating the reaction of lactone or reaction of the hydroxyl group with the carboxyl group include, for example, phoshoric monoesters; BrΦnsted acids such as hydrochloric acid and sulfuric acid; titanates such as tetrabutyl titanate; and organotin compounds such as dibutyltin dilaurate and dimethyltin dichloride.

Although the reaction of the carboxyl group with the epoxy group can be conducted in the absence of any catalyst, a catalyst is preferably used for reducing the reaction time. The catalysts are preferably, for example, imidazoles such as 1-methylimidazole and dimethylimidazole; quaternary phosphonium salts such as tetrabutylphosphonium bromide and tetralaurylphosphonium chloride; and quaternary ammonium salts such as tetraammonium bromide, tetraammonium chloride and trilaurylbutylammonium acetate.

This catalyst is used in a catalytic amount. In particular, the catalyst for the reaction of the hydroxyl group with the carboxyl group or the lactone reaction catalyst is used in an amount of, for example, 0.00001 to 10% by weight, preferably 0.0001 to 1% by weight; and the catalyst for the reaction of the carboxyl group with the epoxy group is used in an amount of 0.001 to 10% by weight, preferably 0.001 to 5% by weight, based on the carboxyl group-containing compound or epoxy compound.

The reaction temperature is usually 100 to 300° C., preferably 120 to 250° C., and the reaction time is 30 minutes to 48 hours, preferably 3 to 12 hours.

The hydroxyl group-containing vinyl oligomers usable as the hydroxyl group-containing oligomers can be produced by polymerizing a hydroxyl group-containing vinyl-polymerizable monomer singly or by copolymerizing it with another vinyl-polymerizable monomer.

Preferred hydroxyl group-containing vinyl-polymerizable monomers are those having a hydroxyl group and a radical-polymerizable unsaturated bonding group. The radical-polymerizable unsaturated bonding groups are preferably, for example, radical-polymerizable vinyl bonding group of the formula: $CHR^1{=}CR^2—$ (each of $R^1$ and $R^2$ being a hydrogen atom, an alkyl group or a single bond). The alkyl groups are linear or branched alkyl groups such as those having 1 to 20 carbon atoms, e. g., methyl, ethyl, propyl and butyl groups.

The hydroxyl group-containing vinyl-polymerizable monomers having both a hydroxyl group and a radical-polymerizable unsaturated bonding group include, for example, those of the following formula:

(1)

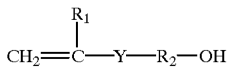

wherein $R^1$ represents a hydrogen atom or a methyl group, $R^2$ represents a divalent alkylene group, and Y represents —COO—, —CO—, —NHCO—, —O— or a single bond. The hydroxyl group-containing acryl oligomers of the above formula wherein Y represents —COO— bond are particularly preferred. The divalent alkylene groups are, for example, linear or branched alkylene groups having 1 to 18 carbon atoms such as methylene, ethylene. propylene, butylene, hexylene, heptylene, octylene, nonylene, decylene, undecylene, dodecylene and tridecylene groups.

The hydroxyl group-containing vinyl-polymerizable monomers of the above formula include, for example, 2-hydroxyethyl (meth)acrylate, 1- or 3-hydroxypropyl (meth)acrylate and 2-, 3- or 4-butyl (meth) acrylate.

The hydroxyl group-containing vinyl-polymerizable monomers of the above formula include also those of the above formula but which is modified with a lactone. Such hydroxyl group-containing vinyl-polymerizable monomers include, for example, those of the following formula (2):

(2)

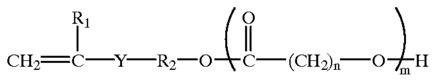

wherein $R^1$, $R^2$ and Y are as defined above, n is 2 to 7, preferably 2 to 5, and m is 1 to 10, preferably 2 to 8.

Examples of the lactone-modified vinyl-polymerizable monomers (lactone adducts) of the above formula (2) include Placcel FM-1, FM-2, FM-3, FM-4, FM-5, FA-1, FA-2, FA-3, FA-4 and FA-5 (products of Daicel Chemical Industries, Ltd.). FM indicates lactone-modified hydroxyl group-containing vinyl-polymerizable monomers of methacrylate type and FA indicates those of acrylate type. The numerals indicate the amount of added ε-caprolactone. For example, FA-1 indicates a hydroxyl group-containing vinyl-polymerizable monomer containing one molecule of ε-caprolactone added thereto.

The lactone-modified vinyl-polymerizable monomers containing a hydroxyl group include, for example, methacryl monomers of the following formula (3):

(3)

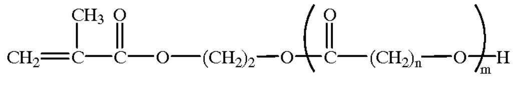

wherein n is 2 to 7 and m is 1 to 10. Placcel FM-1, FM-2, FM-3, FM-4, etc. are monomers of this formula. They have the following structures:

Placcel FM-1

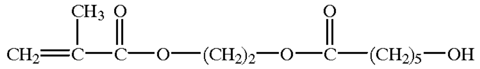

Placcel FM-2

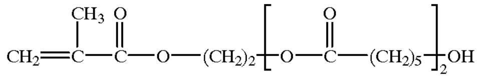

Placcel FM-3

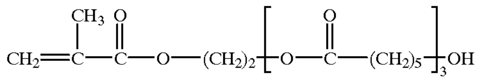

Placcel FM-4

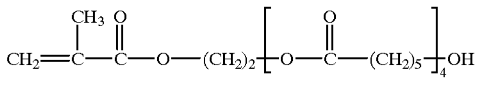

The hydroxyl group-containing vinyl-polymerizable oligomers used in the present invention can be easily produced by polymerizing or copolymerizing the above-described hydroxyl group-containing vinyl-polymerizable monomer.

After the vinyl-polymerizable monomer wherein the distance between the hydroxyl group and the vinyl group is short is once polymerized (if necessary with another polymerizable vinyl monomer), the product may be reacted with a lactone so that the hydroxyl group is introduced at a position distant from the main chain by 10 to 40 atoms.

Further, another functional group such as a carboxyl group or an epoxy group can be used for finally forming the vinyl-polymerizable vinyl oligomer having the hydroxyl group.

For example, the vinyl oligomer having the hydroxyl group can be indirectly produced by a method described below. Methods for producing the vinyl oligomer having a hydroxyl group at such a specified position are as described below.

In one of the methods, a vinyl-polymerizable monomer having a carboxyl group is reacted with a compound having an epoxy group to form a vinyl-polymerizable monomer having a secondary hydroxyl group formed by the reaction of the carboxyl group and the epoxy group, the monomer thus obtained is polymerized with, if necessary, another vinyl-polymerizable monomer to obtain a vinyl oligomer having a hydroxyl group, and a lactone is reacted with the oligomer to form a vinyl oligomer having a hydroxyl group at a position apart from the main chain.

The vinyl-polymerizable monomers having a carboxyl group include, for example, compounds of the above formula (1) but which contains a carboxyl group in place of a hydroxyl group, such as (meth)acrylic acid.

The epoxy group-containing compounds are not particularly limited so far as they have an epoxy group free from a vinyl-polymerizable unsaturated group. Preferred examples of them include epoxides of aliphatic hydrocarbons having an unsaturated bond, particularly α-olefin epoxides, glycidyl ethers and glylcidyl esters. The epoxides of the α-olefin epoxides have preferably 3 to 25 carbon atoms. They include, for example, propylene oxide, AOEX 24 (a mixture of epoxides of α-olefins having 12 and 14 carbon atoms), AOEX 68 (a mixture of epoxides of α-olefins having 16 and 18 carbon atoms) (products of Daicel Chemical Industries, Ltd.). The glycidyl ethers include, for example, butyl glycidyl ether, phenyl glycidyl ether, decyl glycidyl ether and cresyl glycidyl ether. The glycidyl esters include, for example, Cardura E-10 and PES 10 (products of Yuka Shell Epoxy K.K.).

In another method, a vinyl-polymerizable monomer having an epoxy group is reacted with a compound having a carboxyl group to form a vinyl-polymerizable monomer having a secondary hydroxyl group, the monomer thus obtained is polymerized with, if necessary, another vinyl-polymerizable monomer to obtain a vinyl oligomer having a hydroxyl group, and then a lactone is reacted with the oligomer to form a vinyl oligomer having a hydroxyl group at a position apart from the main chain.

The vinyl-polymerizable monomer having an epoxy group is preferably that of the above formula (1) but having an epoxy group in place of a hydroxyl group. Examples of the vinyl-polymerizable monomers having an epoxy group include glycidyl (meth)acrylate.

The compounds having a carboxyl group are not particularly limited so far as they have a carboxyl group free from the vinyl-polymerizable unsaturated group. These compounds include fatty acids such as capric acid and caprylic acid, and half esters obtained by reacting an acid anhydride such as phthalic anhydride or succinic anhydride with an alcohol. The alcohols include, for example, those having one hydroxyl group and polyols having two or more hydroxyl groups.

The alcohols having one hydroxyl group include, for example, methyl alcohol, ethyl alcohol, propyl alcohol and butyl alcohol. The polyols inclulde, for example, diols such as ethylene glycol, propylene glycol, 1,5-hexanediol, 1,6-hexanediol, neopentyl glycol and cyclohexanedimethanol; trihydric alcohols such as trimethylolpropane, trimethylolethane and glycerol; and tetrahydric alcohols such as pentaerythritol and diglycerol.

In still another method, a vinyl-polymerizable monomer having a carboxyl group or an epoxy group is reacted with, for example, another vinyl-polymerizable monomer, the obtained compound is reacted with a compound having an epoxy group or carboxyl group, a lactone is added, if necessary, to the obtained vinyl oligomer to form a vinyl-polymerizable monomer having a hydroxyl group at a position apart from the main chain.

In a further method, a vinyl-polymerizable monomer having an epoxy group is reacted with a polyol, a lactone, an acid anhydride or a dibasic acid to obtain a vinyl-polymerizable monomer having a hydroxyl group, which is polymerized with, if necessary, another vinyl-polymerizable monomer.

The polyols described above are also usable in this method.

The acid anhydrides include phthalic anhydride; alkylphthalic anhydrides such as 4-methylphthalic anhydride; hexahydrophthalic anhydride; alkylhexahydrophthalic anhydrides such as 3-methylhexahydrophthalic anhydride and 4-methylhexahydrophthalic anhydride; succinic anhydride; and tetrahydrophthalic anhydride. From the viewpoint of easiness of the synthesis, the alkylphthalic anhydrides and alkylhexahydrophthalic anhydrides are preferably used.

The dibasic acids include phthalic acid; alkylphthalic acids such as 4-methylphthalic acid; hexahydrophthalic acid; alkylhexahydrophthalic acids such as 3-methylhexahydrophthalic acid and 4-methylhexahydrophthalic acid; succinic acid; and tetrahydrophthalic acid.

In another method, a vinyl-polymerizable monomer having an epoxy group is reacted with, if necessary, another polymerizable vinyl monomer to form a vinyl oligomer having an epoxy group and this product is further reacted with a polyol, a lactone, an acid anhydride or a dibasic acid.

In another method, a polyester polyol is reacted with a vinyl-polymerizable monomer having an isocyanate group to form a vinyl-polymerizable monomer having a hydroxyl group and this product is reacted with, if necessary, another vinyl-polymerizable monomer to form a vinyl oligomer having a hydroxyl group.

The vinyl-polymerizable monomers having an isocyanate group are the compounds of the above formula (1) in which a hydroxyl group is replaced with an isocyanato group. An example thereof is an isocyanateethyl (meth)acrylate.

In another method, a vinyl-polymerizable monomer having an isocyanato group is polymerized with, if necessary, another vinyl-polymerizable monomer to form a vinyl-polymerizable oligomer having an isocyanate group, which is then reacted with a polyol or a polyol/lactone adduct.

Various methods other than those described above are possible, which are self-evident for those skilled in the art.

The vinyl-polymerizable monomers can be polymerized by a well known, ordinary technique such as ion polymerization technique, e. g., anion or cation polymerization technique, or radical polymerization technique. In the present invention, the radical polymerization technique is preferred from the viewpoint of the easiness of the polymerization. However, in producing a hydroxyl group-containing vinyl oligomer having a low molecular weight, another technique such as a technique wherein mercaptoethanol, thioglycerol, a mercaptan such as laurylmercaptan or a chain transfer agent is used in order to obtain a vinyl oligomer having a low molecular weight, a technique wherein the reaction is conducted at a temperature of 60 to 180° C. or a technique wherein the reaction is conducted while the monomer concentration is kept low is desirably employed. The molecular structure of the hydroxyl group-containing vinyl oligomer is not particularly limited. It may have various structures such as linear, comb-shaped, block-shaped, star-shaped and star-burst shaped structures.

The radical polymerization is desirably conducted in a solution. The solvent used for the radical solution polymerization is any solvent ordinarily used for the polymerization of a vinyl-polymerizable monomer such as an acryl monomer. Examples of such solvents include esters, alcohols, aromatic hydrocarbons and ketones such as toluene, xylene, butyl acetate, butanol, methyl ethyl ketone, methyl isobutyl ketone and Solvesso (a product of Exxon Corporation).

The radical reaction initiator used for the radical solution polymerization can be any of reaction initiators ordinarily used for the radical polymerization. Examples of the reaction initiators include peroxides such as benzoyl peroxide, lauroyl peroxide, t-butyl hydroperoxide and t-butyl peroxy-2-ethylhexanol; and azo compounds such as azobisvaleronitri le, azobisisobutyronitri le and azobis(2-methylpropionitrile).

Other polymerizable monomers such as α, β-ethylenically unsaturated monomers usable for the production of the hydroxyl group-containing vinyl oligomers used in the present invention include, for example, those listed below.

(1) Acrylic or Methacrylic Esters:

For example, alkyl ($C_1$ to $C_{18}$) acrylates and methacrylates such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl ($C_2$ to $C_{18}$) acrylates and methacrylates such as methoxybutyl acrylate, methoxybutyl methacrylate, methoxyethyl acrylate, methoxyethyl methacrylate, ethoxybutyl acrylate and ethoxybutyl methacrylate; and alkenyl ($C_2$ to $C_8$) acrylates and methacrylates such as allyl acrylate and allyl methacrylate; and alkenyloxyalkyl ($C_3$ to $C_{18}$) acrylates and methacrylates such as allyloxyethyl acrylate and allyloxyethyl methacrylate.

(2) Vinyl Compounds:

For example, vinyl acetate, hexafkluoropropylene, tetrafluoropropylene, styrene, α-methylstyrene, vinyltoluene and p-chlorostyrene.

(3) Polyolefin Compounds:

For example, butadiene, isoprene and chloroprene. ps (4) Allyl Ethers:

For example, hydroxyethyl allyl ether.

(5) Others:

For example, methacrylamide, acrylamide, diacrylamide, dimethacrylamide, acrylonitrile, methacrylonitrile, methyl isopropenyl ketone, vinyl acetate, vinyl propionate, vinyl pivalate, acrylic acid, methacrylic acid, N,N-dialkylaminoalkyl (meth)acrylates, perfluorovinyl ethers such as trifluoromethyl vinyl ether, and vinyl ethers such as hydroxyethyl vinyl ether and hydroxybutyl vinyl ether.

The amount of the hydroxyl group in the hydroxyl group-containing oligomer used in the present invention is preferably 0.5 to 3.0 mol/kg-resin, particularly preferably 0.7 to 2.0 mol/kg-resin. When it is below 0.5 mol/kg-resin, the crosslinking is insufficient and gasoline resistance is inclined to be reduced. On the contrary, when the amount of the hydroxyl group is above 3.0 mol/kg-resin, the crosslinking density becomes too high to increase the cure shrinkage and also to damage the appearance.

The hydroxyl group-containing oligomers have a number-average molecular weight of preferably 1,000 to 50,000, particularly preferably 1,500 to 30,000. When the number-average molecular weight is below 1,000, the oligomers having a functional group in the molecule are formed and the gasoline resistance is inclined to lower. On the contrary, when the number-average molecular weight is above 50,000, the viscosity becomes too high, a large amount of the diluent is necessitated and the formation of the thick coating becomes difficult.

As aminoplast resins used together with the hydroxyl group-containing oligomer in the process of the present invention, those used hitherto for the reaction of the hydroxyl group-containing oligomer and the aminoplast resin curing agent can be used without particular limitation. Such aminoplast resins include, for example, melamine resins, benzoguanamine resins and urea resins.

Melamine resins are preferred aminoplast resins. The melamine resins are produced by polymerizing melamine with formaldehyde by a method well known in the art. Among the melamine resins, particularly preferred melamine resin is that containing 50 to 100% of a mononuclear melamine of the following formula (4):

(4)

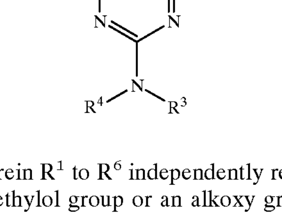

wherein $R^1$ to $R^6$ independently represent a hydrogen atom, a methylol group or an alkoxy group having 1 to 5 carbon atoms.

When the alkoxy group in the formula (4) has more than 5 carbon atoms, the viscosity of the resin is too high unfavorably. Preferred carbon number is 1 to 4. Examples of the alkoxy groups include methoxy, ethoxy, propoxy, butoxy and isobutoxy groups.

The melamine resin may be either a mononuclear compound or a polynuclear compound formed by self-condensation. $R^1$ to $R^6$ of the above formula (4) of the melamine may be alkoxy groups, a mixture of hydrogen atoms and methylol groups, a mixture of hydrogen atoms and alkoxy groups, a mixture of methylol groups and alkoxy groups or a mixture of hydrogen atoms, methylol groups and alkoxy groups. Examples of the melamine resins include Uvan 60 R (Mitsui Toatsu Chemicals, Inc.), Cymel 325, Cymel 327 and Cymel 370 (Mitsui Cyanamide) [compounds of the formula (4) wherein $R^1$ to $R^6$ each represent a methylol group], Superbekamine L-116-70 (Dainippon Ink and Chemicals, Inc.), Superbekamine L-121-60 (Dainippon Ink and Chemicals, Inc.), Uvan 22 R (Mitsui Toatsu Chemicals, Inc.), Uvan 21 R (Mitsui Toatsu Chemicals, Inc.) and Uvan 2028 (Mitsui Toatsu Chemicals, Inc.) (products of imino type), Cymel 303 (Mitsui Cyanamide) and Uvan 120 (Mitsui Toatsu Chemicals, Inc.) [compounds of the formula (4) wherein $R^1$ to $R^6$ each represent an alkoxy group].

The hydroxyl group-containing oligomer/aminoplast resin ratio is usually 90/10 to 40/60, preferably 80/20 to 60/40. When the ratio is above 90/10, the crosslinking is insufficient and the gasoline resistance is inclined to lower. On the contrary, when the ratio is below 40/60, the self-condensation reaction of the aminoplast resin is accelerated to make the coating brittle and to lower the resistance to chipping.

The base coating paint used in the present invention may contain a curing catalyst for accelerating the curing reaction of the hydroxyl group of the hydroxyl group-containing oligomer and the aminoplast resin curing agent. The base coating paint may contain microgel as a rheology modifier, as well as the acryl oligome/melamine resin.

An acid catalyst is used as a curing catalyst. The acid catalysts are, for example, strong acid catalysts or weak acid catalysts. The strong acid catalysts include inorganic acids such as hydrochloric acid, nitric acid and sulfuric acid; organic acids such as sulfonic acids; and esters and salts such as ammonium salts and onium salts of them. The strong acid catalysts are preferably sulfonic acids, their esters and amine salts, benzoic acid, trichloroacetic acid, etc. Examples of sulfonic acids include aliphatic sulfonic acids such as methanesulfonic acid and ethanesulfonic acid; and aromatic sulfonic acids such as p-toluenesulfonic acid, dodecylbenzenesulfonic acid, naphthalenedisulfonic acid, dinonylnaphthalenesulfonic acid and dinonylnaphthalenedisulfonic acid. The strong acid catalysts are preferably aromatic sulfonic acids and esters of them. Among them, dodecylbenzenesulfonic acid and dinonylnaphthalenedisulfonic acid are particularly preferred, since they improve the water resistance of the coating.

On the other hand, the weak acid catalysts include, for example, phosphoric acids, phosphoric monoesters, phosphorous esters and unsaturated group-containing phoshoric esters. The weak acid catalysts are particularly preferably phosphoric acids and esters thereof. The phosphoric acids and esters thereof are, for example, phosphoric acid, pyrophosphoric acid and mono- or diesters of phosphoric acids. The phosphoric monoesters include, for example, monooctyl phosphate, monopropyl phosphate and monolauryl phosphate. The phosphoric diesters include, for example, dioctyl phosphate, dipropyl phosphate and dilauryl phosphate. Further, mono(2-(meth)acryloyloxyethyl) acid phosphate is also usable.

When the melamine curing agent in the base coating paint contains at least 85% of a complete alkoxy-type alkoxy group, the strong acid catalyst is effective and, on the contrary, when it is of imino type or methylol type, the weak acid catalyst is effective.

When a strong basic catalyst is used as the curing catalyst for the clear coating paint, the curing catalyst for the base coating paint is preferably a weak acid one. When a strong acid catalyst is used for curing the base coating paint, it forms a stable salt with the strong basic catalyst used as the curing catalyst for the clear coating paint to make the catalytic effect insufficient. However, even in such a case, a sufficient curing reaction can be attained by increasing the amount of the catalyst.

The amount of the curing catalyst for the base coating paint is determined depending on the weight of the hydroxyl group-containing oligomer in the range of 0.001 to 10%, preferably 0.001 to 5%.

In addition to the incorporation of the curing catalyst for the base coating paint into this paint, it is also possible to obtain the catalytic effect by introducing an acidic group into the hydroxyl group-containing oligomer to be incorporated into the base coating paint. The acidic groups include, for example, carboxyl and phosphoric acid groups. The acidic group can be easily introduced into the oligomer by using the acidic group-containing vinyl-polymerizable monomer in combination with the starting monomer in the production of the hydroxyl group-containing vinyl oligomer. Thus, it is unnecessary to incorporate the curing catalyst when such an acidic group is present in the hydroxyl group-containing oligomer. When the curing catalyst is unused, the hydroxyl group-containing oligomer has an acid value of preferably 5 to 50, particularly preferably 10 to 30.

The base coating paint used in the present invention contains also the curing catalyst for curing the clear coating paint to be coated thereon by a wet-on-wet technique. By previously incorporating the curing catalyst for the clear coating paint into the base coating paint, the problem of thickening during the storage can be solved.

The curing catalyst for the clear coating paint is different from that for the base coating paint, and it may be either acidic or basic catalyst and is not particularly limited. Further, the curing catalyst for the clear coating paint may be that reactive with the curing catalyst in the base coating paint as described above.

The curing catalyst for the clear coating paint is a basic or acidic compound having a boiling point of 150° C. or above under 760 mmHg. When the boiling point is below 150° C., the volatility is too high and the clear coating paint is not sufficiently cured. The boiling point is preferably 180° C. or higher.

The molecular weight of the curing catalyst is preferably 100 to 400, more preferably 160 to 350. When the molecular weight is below 100, the curing catalyst is easily volatilized in the course of the coating and the sufficient curing of the clear coating paint is made difficult. On the contrary, when the molecular weight is above 400, the migration of the curing catalyst from the base coating paint to the clear coating paint becomes difficult unfavorably.

Examples of the basic curing catalysts include tertiary amine compounds. amide compounds, quaternary ammonium compounds and quaternary phosphonium compounds. Among them, the tertiary amine compounds and amide compounds which easily migrate to the clear coating paint are particularly preferred.

Preferred examples of the tertiary amine compounds include those having the following structure (5):

(5)

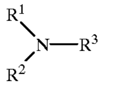

wherein $R^1$, $R^2$ and $R^3$ independently represent an alkyl or aryl group, or $R^2$ and $R^3$ may form together a tertiary amine compound having a five-membered or six-membered ring together with the nitrogen atom bonded therewith.

The alkyl groups are substituted or unsubstituted alkyl groups having preferably 1 to 15 carbon atoms, particularly preferably 1 to 10 carbon atoms. The unsubstituted alkyl groups include, for example, methyl, ethyl, propyl, butyl, pentyl, hexyl, heptyl and octyl groups. The aryl groups include substituted or unsubstituted aryl groups such as phenyl and naphthyl groups.

The substituents of the substituted alkyl and aryl groups include, for example, alkyl groups, aryl groups, amino groups, halogen atoms, hydroxyl group, cyano group, nitro group, sulfone group, carboxyl group and vinyl group. The alkyl groups are preferably those having 1 to 10 carbon atoms. Examples of the alkyl groups include methyl, ethyl, propyl, butyl, pentyl, hexyl, heptyl and octyl groups. The aryl groups are the same as the above-described aryl groups.

The acyclic tertiary amine compounds include, for example, tributylamine (molecular weight: 185, boiling point: 212° C.), tripropylamine (m.w.: 143, b.p. 156° C.), trioctylamine (m.w.: 319, b.p. 365° C. ), N,N-dimethylhexylamine (m.w.: 129, b. p. 155° C. ), N, N-diethylbenzylamine (m.w.: 149, b.p. 210° C.), N,N-dimethylaniline (m.w.: 121, b.p. 193° C.), N,N-diethylaniline (m.w.: 149, b.p. 215° C.), N,N-dipentylaniline (m.w.: 233, b.p. 280° C.), N,N-dimethylnaphthylamine (m.w. : 171, b.p. 274° C.), N,N-dimethyl-o-toluidine (m.w. : 135, b.p. 185° C.), N,N-dimethyl-m-toluidine (m.w. 135, b.p. : 211° C.), N,N-dimethyl-p-toluidine (m.w. : 135, b.p. 210° C.), N,N-diphenylmethylamine (m.w. : 183, b. p. 282° C.), N, N-diphenylethylamine (m.w. : 197, b.p. 286° C.), N, N, N', N'-tetramethyl-o-phenylenediamine (m.w.: 150, b.p. 214° C.) and N,N,N', N'-tetramethyl-m-phenylenediamine (m.w.: 150, b.p. 267° C.).

The cyclic tertiary amine compounds include, for example, 2,3-dimethylpyridine (m.w.: 107, b.p. 161° C.), 2, 4-dimethylpyridine (m.w.: 107, b. p. 157° C.), 3,4-dimethylpyridine (m.w.: 107, b. p. 179° C.), 2-benzylpyridine (m.w. : 169, b.p. 276° C.), 3-benzylpyridine (m.w.: 169, b.p. 288° C.), 4-benzylpyridine (m.w. : 169, b.p. 287° C.), 2-phenylpyridine (m.w. : 155, b.p. 276C.), 2-chloropyridine (m.w. : 113, b.p. 170° C.), 2-vinylpyridine (m. w. : 106, b. p. 160° C.), pyrazine (m.w. : 80, b. p. 208° C.), 2,5-dimethylpyrazine (m.w.: 106, b. p. 155° C. ), N-methyl-2-pyrrolidone (m.w. : 99, b.p. 202° C.) and 1-methylimidazole (m.w. : 82, b.p. 195° C.).

Preferred amide compounds are, for example, those having the following structures (6):

(6)

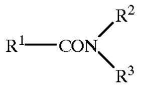

wherein $R^1$, $R^2$ and $R^3$ independently represent a hydrogen atom, an alkyl group or an aryl group.

The alkyl groups include substituted or unsubstituted alkyl groups having preferably 1 to 15 carbon atoms, particularly preferably 1 to 10 carbon atoms. The unsubstituted alkyl groups include, for example, methyl, ethyl, propyl, butyl, pentyl, hexyl, heptyl and octyl groups. The aryl groups include substituted or unsubstituted aryl groups such as phenyl and naphthyl groups.

The substituents of the substituted alkyl or aryl groups include, for example, alkyl groups, aryl groups, amino groups, halogen atoms, hydroxyl group, cyano group, nitro group, sulfone group, carboxyl group and vinyl group. The alkyl groups are preferably those having 1 to 10 carbon atoms. Examples of such alkyl groups include methyl, ethyl, propyl, butyl, pentyl, hexyl, heptyl and octyl groups. The aryl groups are the same as those described above.

An example of the acyc ic amide compounds is N,N-dimethylformamide (m.w. 73, b.P. 158° C.).

The quaternary ammonium compounds are salts formed from a quaternary ammonium and a counter ion such as a halogen or an acetate. The halogen atoms constituting the counter ion are, for example, chlorine, bromine and iodine atoms.

The quaternary ammoniums are represented by the formula: $R^1R^2R^3R^4N$ wherein $R^1$ to $R^4$ independently represent an alkyl or aryl group which may be substituted. The alkyl and aryl groups are the same as those described above. However, the number of the carbon atoms in the alkyl groups is preferably at least 4. When it is below 4, the compound is easily soluble in the solvent unfavorably.

Examples of the quaternary ammonium salts having a boiling point of 150° C. or higher include tetramethylammonium, tetrabutylammonium, trimethyl(2-hydroxypropyl)ammonium, cyclohexyltrimethylammonium, tetrakis(hydroxymethyl) ammonium, and halogen-containing compounds and acetates such as o-trifluoromethylphenyltrimethylammonium and trilaurylmethylammonium acetate.

Preferred examples of the quaternary phosphonium compounds having a boiling point of 150° C. or higher include tetraalkylphosphonium halides and acetates. The tetraalkylphosphoniums include, for example, tetramethylphosphonium, tetraethylphosphonium, tetrapropylphosphonium and tetrabutylphosphonium. However, the alkyl groups preferably have 4 or more carbon atoms, since when the carbon number is below 4, the compound is easily soluble in the solvent unfavorably. The halogen atoms constituting the halides are, for example, chlorine, bromine and iodine. The anions constituting the phosphonium compounds include those described above and, in addition, $ClO_4$—, $SbF_6$—, $PF_6$—, etc. An example of the compounds is tetrabutylphosphonium bromide.

The preferred acidic curing catalysts for the clear coating paint include, for example, aliphatic carboxylic acids, phosphoric acid and mono- or diesters thereof, and sulfonic acid. Among them, the aliphatic carboxylic acids are particularly preferred.

The preferred aliphatic carboxylic acids include, for example, saturated or unsaturated, cyclic or alicyclic fatty acids.

Such fatty acids are preferably those represented by the following general formula (7) or (8):

$$R^1—CH_2═CH—COOH \quad (7)$$

-continued $$R^2—COOH \quad (8)$$

wherein $R^1$ represents a hydrogen atom, an alkyl group or an aryl group, and $R^2$ represents an acyclic alkyl group or an alicyclic alkyl group.

The ranges of the alkyl and aryl groups are the same as those of the above formula (6). The alicyclic alkyl groups include, for example, those having three- to six-membered rings.

Examples of the carboxylic acids represented by the formula (7) include methacrylic acid (m.w.: 86, b.p.: 159° C.) and isocrotonic acid (m.w.: 86, b.p.: 169° C.).

The acyclic carboxylic acids of the formula (8) include, for example, chloroacetic acid (molecular weight: 118, boiling point: 188° C.), dichloroacetic acid (m.w.: 152, b.p. 192° C.), dibromoacetic acid(m.w.: 242, b.p. 232° C.), chloropropionic acid (m.w.: 110, b.p. 185° C.), dichloropropionic acid (m.w.: 114, b.p. 210° C.), 2-ethylbutyric acid (m.w.: 116, b.p. 193° C.), valeric acid (m.w.: 102, b.p. 184° C.), isovaleric acid (m.w.: 102, b.p. 176° C.), isobutyric acid (m.w.: 88, b.p. 155° C.), heptanoic acid (m.w.: 130, b.p. 223° C.), hexanoic acid (m.w.: 116, b.p. 205° C.), octanoic acid (m.w.: 114, b.p. 239° C.), decanoic acid (m.w.: 172, b.p. 268° C.) and undecanoic acid (m.w.: 186, b.p. 284° C.). The cyclic carboxylic acids include, for example, cyclopropanecarboxylic acid (m.w.: 86, b. p. 181° C.) and cyclohexanecarboxylic acid (m.w.: 128, b.p. 233° C.).

Phosphoric acids and esters thereof include, for example, phosphoric acid, pyrophosphoric acid and monoesters and diesters of phosphoric acid. Monoesters of phosphoric acid having a boiling point of 150° C. or higher include, for example, monooctyl phosphate, monopropyl phosphate and monolauryl phosphate. The diesters of phosphoric acid include, for example, dioctyl phosphate, dipropyl phosphate and dilauryl phosphate.

The sulfonic acids having a boiling point of 150° C. or higher include, for example, aliphatic sulfonic acids such as methanesulfonic acid and ethanesulfonic acid; and aromatic sulfonic acids such as p-toluenesulfonic acid, dodecylbenzenesulfonic acid, naphthalenedisulfonic acid, dinonylnaphthalenesulfonic acid and dinonylnaphthalenedisulfonic acid.

The basic curing catalyst for the clear coating paint is used in an amount of usually 5 to 100 mmol, preferably 10 to 80 mmol, per 100 parts of the solid resin content of the base coating paint. When it is below 5 mmol, it is difficult to sufficiently accelerate the curing of the clear coating paint. On the contrary, when it is above 100 mmol, the coating is discolored and the water resistance thereof is reduced unfavorably. For the same reasons as above, the acidic curing catalyst for the clear coating paint is used in an amount of usually 5 to 50 mmol, preferably 10 to 40 mmol, per 100 parts of the solid resin content of the base coating paint.

The base coating paint used in the present invention can be used as it is or, if necessary, suitably contain various additives usually used in the technical field of paintings, such as a pigment (for example, a coloring pigment or glitter), anti-sagging agent or anti-settling agent, levelling agent, dispersing agent, defoaming agent, ultraviolet absorber, light stabilizer, antistatic agent and thinner.

Preferred pigments or glitters are, for example, titanium oxide, carbon black, precipitated barium sulfate, calcium carbonate, talc, kaolin, silica, mica, aluminum, red iron oxide, lead chromate, lead molybdate, chromium oxide, cobalt aluminate, azo pigment, phthalocyanine pigment and anthraquinone pigment.

Preferred anti-sagging agents or anti-settling agents are, for example, bentonite, castor oil wax, amide wax and microgel [such as MG 100 S (a product of Dainippon Ink and Chemicals, Inc.)].

Preferred levelling agents are, for example, silicon-containing products such as KF 69, KP 321 and KP 301 (products of Shin-Etsu Chemical Co., Ltd.), Modaflow (a product of Mitsubishi Monsanto Chemical Co.), BYK 358 and 301 (products of BYK Chemie Japan KK) and Diaaid AD 9001 (a product of Mitsubishi Rayon Co., Ltd.).

Preferred dispersing agents are, for example, Anti-Terra U, Anti-Terra P and Disperbyk-lO1 (products of BYK Chemie Japan KK).

An example of preferred defoaming agents is BYK-0 (a product of BYK Chemie Japan KK).

Preferred ultraviolet absorbers are, for example, benzotriazole ultraviolet absorbers such as Tinuvin 900, Tinuvin 384 and Tinuvin P (products of Ciba-Geigy) and oxalic anilide ultraviolet absorbers such as Sanduvor 3206 (a product of Sandoz).

Preferred light stabilizers are, for example, hindered amine light stabilizers such as Sanol LS 292 (a product of Sankyo Co., Ltd.) and Sanduvor 3058 (a product of Sandoz).

Preferred thinners are, for example, aromatic compounds such as toluene, xylene and ethylbenzene; alcohols such as methanol, ethanol, propanol, butanol and isobutanol; ketones such as acetone, miethyl isobutyl ketone, methyl amyl ketone, cyclohexanone, isophorone and N-methylpyrrolidone; ester compounds such as ethyl acetate, butyl acetate and methyl cellosolve; and mixtures of them.

Preferred antistatic agents include, for example, Esocard C 25 (a product of Lion Armor).

The base coating paint of the present invention can be coated by various well known coating methods.

The base coating paint is used to form a coating (in a dry state) having a thickness of usually 10 to 30, μm, preferably 15 to 25 μm.

The clear coating paint used in the present invention is not particularly limited so far as the curing system of the clear coating paint is different from that of the base coating paint.

The curing system for the clear coating paint comprises these using a functional group or a combination of functional groups, which are preferably as follows:

1. curing system of a carboxyl group or blocked carboxyl group and an epoxy group,
2. curing system of a phosphoric acid group or blocked phosphoric acid group and an epoxy group,
3. curing system of an acid anhydride group, a blocked hydroxyl group and an epoxy group,
4. curing system of an acid anhydride group, a blocked hydroxyl group, an epoxy group and a silanol group or hydrolyzable silyl group,
5. curing system of an acetoacetyl group and a vinyl (thio)ether group,
6. curing system of a blocked carboxyl group and a vinyl (thio)ether group,
7. curing system of a silyl-blocked phosphoric acid group and a vinyl (thio)ether group,
8. curing system of an alicyclic epoxy group used singly, and
9. curing system of a hydrolyzable silyl group and an alicyclic epoxy group.

These curing systems will be more specifically described as typical examples.

1. Curing System of a Carboxyl Group or Blocked Carboxyl Group and an Epoxy Group:

The carboxyl group is a functional group represented by —COOH.

Preferred examples of the blocked carboxyl groups include those of the following formula (9):

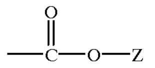

(9)

wherein Z represents a blocking group derived from the blocking agent and bonded to the hydroxyl group in the carboxyl group. Preferred examples of Z include those of formulae given below.

[1] silyl blocking groups:

The silyl blocking groups are, for example, those of the following formula (10):

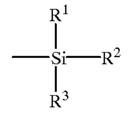

(10)

wherein $R^1$ to $R^3$ independently represent an alkyl group or an aryl group. The alkyl group is a linear or branched alkyl group having 1 to 10 carbon atoms, and is particularly preferably a lower alkyl group having 1 to 8 carbon atoms such as methyl, ethyl, propyl, butyl, s-butyl, t-butyl, pentyl and hexyl groups. The aryl group is, for example, phenyl, naphthyl and indenyl groups which may have a substituent. Among them, a phenyl group is particularly preferred.

The silyl blocking group of the above formula (10) includes, for example, trimethylsilyl, diethylmethylsilyl, ethyldimethylsilyl, butyldimethylsilyl, butylmethylethylsilyl, phenyldimethylsilyl, phenyldiethylsilyl, diphenylmethylsilyl and diphenylethylsilyl groups. The smaller the molecular weight of $R^1$ to $R^3$, the better, since the silyl blocking group is easily removed to improve the curing properties.

Silane halides are usable as preferred blocking agents capable of forming the silyl blocking groups. The halogen atoms contained in the silane halides include chlorine atom, bromine atom, etc. Examples of the blocking agents include trimethylsilyl chloride, diethylmethylsilyl chloride, ethyldimethylsilyl chloride, butyldimethylsilyl bromide and butylmethylethylsilyl bromide.

[2] Vinyl (thio)ether blocking groups:

The vinyl (thio)ether blocking groups are, for example, those of the following formula (11):

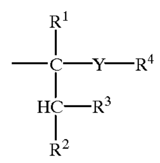

(11)

wherein $R^1$, $R^2$ and $R^3$ independently represent a hydrogen atom or a hydrocarbon group having 1 to 18 carbon atoms, $R^4$ represents a hydrocarbon group having 1 to 18 carbon atoms, Y represents an oxygen stom or a sulfur atom, and $R^3$ and $R^4$ may be bonded together to form a heterocyclic ring containing Y as a hetero atom.

The hydrocarbon group in the above formula includes, for example, alkyl, cycloalkyl and aryl groups. The alkyl group is particularly preferably a lower alkyl group having 1 to 8 carbon atoms such as methyl, ethyl, propyl, butyl, s-butyl, t-butyl, pentyl and hexyl groups. The cycloalkyl group is, for example, cyclopentyl and cyclohexyl groups. The aryl group includes substituted or unsubstituted phenyl, naphthyl and anthracene groups. A phenyl group is particularly preferred.

The vinyl (thio)ether blocking group can be formed by reacting an aliphatic vinyl (thio)ether or cyclic vinyl (thio) ether with a hydroxyl group of a carboxyl group. The aliphatic vinyl ethers include, for example, methyl vinyl ether, ethyl vinyl ether, isopropyl vinyl ether, n-propyl vinyl ether, isobutyl vinyl ether, 2-ethylhexyl vinyl ether and cyclohexyl vinyl ether, as well as corresponding vinyl thioethers. The cyclic vinyl ethers include, for example, 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyrane-2-on, 3,4-dihydro-2-ethoxy-2H-pyran and sodium 3,4-dihydro-2H-pyran-2-carboxylate.

The epoxy groups include non-alicyclic epoxy groups and alicyclic epoxy groups. The non-alicyclic epoxy groups include, for example, those having an epoxy bond formed with an oxygen atom between carbon atoms of alkyl groups such as 1,2-epoxy and 1,3-epoxy groups. The alicyclic epoxy groups are those having an epoxy bond formed with an oxygen atom between carbon atoms adjacent to each other in a five-membered or six-membered ring (including a crosslinked hydrocarbon). The non-alicyclic epoxy group is practically preferred to the alicyclic epoxy group, since the curing reactivity of the alicyclic epoxy group with the basic curing catalyst is inferior to that of the non-alicyclic epoxy group.

The oligomers used for forming the clear coating paint of the above curing system are not particularly limited and they may be polyester oligomer or vinyl oligomer so far as they have the above-described functional groups. The description will be given with reference to mainly the vinyl oligomers which can be easily produced. The same shall apply to other curing systems.

The vinyl oligomers may contain the above-described blocked carboxyl group and epoxy group in the same molecule.

The vinyl oligomers containing the carboxyl group or blocked carboxyl group have a number-average molecular weight (Mn) of usually 800 to 20,000, preferably 1,500 to 15,000. When the number-average molecular weight is below 800, the solubility in the solvent is reduced and the oligomers having no functional group in the molecule are present to reduce the water resistance, gasoline resistance, etc. On the contrary, when the number-average molecular weight is above 20,000, the viscosity becomes too high, a larger amount of the solvent is necessitated and the formation of the thick film becomes difficult unfavorably.

The vinyl oligomers having an epoxy group have a number-average molecular weight (Mn) of usually 600 to 30,000, preferably 800 to 20,000. When the number-average molecular weight is below 600, the oligomers having no functional group in the molecule are partially formed to make the crosslinking insufficient and also to make the gasoline resistance and scuff resistance insufficient. On the contrary, when the number-average molecular weight is above 30,000, the viscosity becomes too high, a larger amount of the solvent is necessitated and the formation of the thick film becomes difficult unfavorably.

The amount of the functional groups (carboxyl group or blocked carboxyl group and/or epoxy group) in the vinyl oligomer is usually 1 to 5 mol/kg-resin, preferably 2 to 4 mol/kg-resin. When it is below 1 mol/kg-resin, the crosslinking density is lowered and the scuff resistance and gasoline resistance are reduced. On the contrary, when the amount of the functional groups is above 5 mol/kg-resin, the crosslinking density becomes too high, the weather resistance is reduced and the film is easily cracked unfavorably.

The vinyl oligomers are obtained by polymerizing or copolymerizing a monomer having a radical-polymerizable unsaturated bonding group. For example, when the vinyl oligomers are synthesized from acrylic acid or. methacrylic acid monomer, acrylic oligomers are obtained. The monomers can be polymerized by a well known, ordinary technique such as an ion polymerization technique, e. g., anion or cation polymerization technique, or radical polymerization technique. In the present invention, the radical polymerization technique is preferred from the viewpoint of the easiness of the polymerization. However, in producing a vinyl oligomer having a low molecular weight, another polymerization technique such as a technique wherein mercaptoethanol, thioglycerol, a mercaptan such as laurylmercaptan or a chain transfer agent is used, a technique wherein the reaction is conducted at a temperature of as high as 140 to 180° C. or a technique wherein the reaction is conducted while the monomer concentration is kept low, can be employed.

The radical polymerization is desirably conducted in a solution. The solvent used for the radical solution polymerization is any solvent ordinarily used for the polymerization of a vinyl-polymerizable monomer such as acryl monomer. Examples of such solvents include toluene, xylene, butyl acetate, methyl ethyl ketone, methyl isobutyl ketone and Solvesso (a product of Exxon Corporation).

The radical reaction initiator used for the radical solution polymerization can be any of reaction initiators ordinarily used for the radical polymerization. Examples of the reaction initiators include peroxides such as benzoyl peroxide, lauroyl peroxide, t-butyl hydroperoxide di-t-butyl hydroperoxide and t-butyl peroxy-2-ethylhexanoate; and azo compounds such as azobisvaleronitrile, azobisisobutyronitrile and azobis(2-methylpropionitrile).

The radical-polymerizable unsaturated bonding groups are preferably, for example, radical-polymerizable vinyl bonds of the formula: $CHR^1{=}CR^2$—wherein $R^1$ and $R^2$ each represent a hydrogen atom, an alkyl group or a single bond. The alkyl group herein includes a linear or branched alkyl group and is preferably those having 1 to 20 carbon atoms such as methyl, ethyl, propyl and butyl groups.

The vinyl-polymerizable monomer having a carboxyl group may have, for example, two or more carboxyl groups. The preferred monomers having one carboxyl group in the molecule include, for example, (meth)acrylic acid. The vinyl-polymerizable monomers having two carboxyl groups in the molecule include, for example, itaconic, maleic, mesaconic and fumaric acids. A product obtained by reacting an acid anhydride such as maleic anhydride or itaconic anhydride with an alcohol having 1 to 18 carbon atoms or an amine is also usable. Such alcohols include, for example, methanol, ethanol, propanol and butanol. Alcohols having more than 18 carbon atoms are not preferred, since the plasticity of the obtained coating becomes too high.

These amines include aliphatic amines such as dibutylamine, dihexylamine, methylbutylamine, ethylbutylamine and n-butylamine; and aromatic amines such as aniline and toluidine.

The vinyl-polymerizable monomers having a carboxyl group include also hydroxy acids having a radical-polymerizable unsaturated bonding group. Such a hydroxy acid can be produced by reacting a monomer having a hydroxyl group and a radical-polymerizable unsaturated bonding group with an acid anhydride. In particular, they can be produced by reacting a hydroxyalkyl (meth)acrylate such as 2-hydroxyethyl (meth) acrylate with 4-methylhexahydrophthalic anhydride, succinic anhydride, trimellitic anhydride or phthalic anhydride.

The vinyl-polymerizable monomers having a blocked carboxyl group and a radical-polymerizable unsaturated bonding group include vinyl-polymerizable monomers obtained by blocking the above-described vinyl-polymerizable monomer having a carboxyl group with the above-described blocking agent.

As the monomers having an epoxy group, those having an epoxy group and the above-described radical-polymerizable unsaturated bonding group in the molecule are preferably used.

The monomers having an epoxy group and the above-described radical-polymerizable unsaturated bonding group include, for example, epoxy group-containing monomers such as glycidyl (meth)acrylate and 3,4-epoxycyclohexyl (meth)acrylate.

In the synthesis of the vinyl oligomers, vinyl-polymerizable monomers other than those described above are also usable. Examples of the vinyl-polymerizable monomers include the following compounds:

(1) Acrylic or Methacrylic Esters:

For example, alkyl ($C_1$ to $C_{18}$) acrylates and methacrylates such as methyl acrylate, ethyl acrylate, propyl acrylate, isopropyl acrylate, butyl acrylate, hexyl acrylate, 2-hexyl acrylate, octyl acrylate, lauryl acrylate, methyl methacrylate, ethyl methacrylate, propyl methacrylate, isopropyl methacrylate, butyl methacrylate, hexyl methacrylate, 2-hexyl methacrylate, octyl methacrylate and lauryl methacrylate; alkoxyalkyl ($C_2$ to $C_{,8}$) acrylates and methacrylates such as methoxybutyl acrylate, methoxybutyl methacrylate, methoxyethyl acrylate, methoxyethyl methacrylate, ethoxybutyl acrylate and ethoxybutyl methacrylate; and alkenyl ($C_2$ to $C_8$) acrylates and methacrylates such as allyl acrylate and allyl methacrylate; and alkenyloxyalkyl ($C_3$ to $C_{,8}$) acrylates and methacrylates such as allyloxyethyl acrylate and allyloxyethyl methacrylate.

(2) Vinyl Compounds:

For example, styrene, α-methylstyrene, vinyl acetate, hexafluoropropylene, tetrafluoropropylene, vinyltoluene and p-chlorostyrene.

(3) Polyolefin Compounds:

For example, butadiene, isoprene and chloroprene.

(4) Allyl Ethers:

For example, hydroxyethyl allyl ether.

(5) Others:

For example, methacrylamide, acrylamide, diacrylamide, dimethacrylamide, acrylonitrile, methacrylonitrile, methyl isopropenyl ketone, vinyl acetate, vinyl propionate, vinyl pivalate, N,N-dialkylaminoalkyl (meth)acrylates, phosphoric acid group-containing (meth)acrylates such as phosphonoxyethyl (meth)acrylate, perfluorovinyl ethers such as trifluoromethyl vinyl ether, and vinyl ethers such as hydroxyethyl vinyl ether and hydroxybutyl vinyl ether.

2. Curing System of a Phosphoric Acid Group or Blocked Phosphoric Acid Group and an Epoxy Group:

The phosphoric acid group is a functional group represented by the following formula (12):

(12)

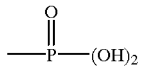

The blocked carboxyl groups are functional groups represented by the following formula (13):

(13)

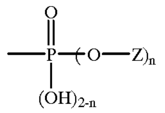

wherein Z represents a blocking group derived from the blocking agent and bonded to the hydroxyl group of the phosphoric acid group, and n is 1 or 2. From the viewpoint of the storability, it is preferred that n is 2 and all the hydroxyl groups are blocked.

Preferred examples of the blocking group Z include the silyl blocking group or vinyl (thio)ether blocking group as described above.

The range of the epoxy groups are the same as that described above.

The vinyl oligomers used in the curing system may contain the above-described phosphoric acid group or blocked phosphoric acid group and an epoxy group in the same molecule.

The vinyl oligomers containing the phosphoric acid group or blocked phosphoric acid group have a number-average molecular weight (Mn) of usually 600 to 30,000, preferably 800 to 20,000. When the number-average molecular weight is below 600, the solubility in the solvent is reduced and the oligomers having no functional group are present to make the water resistance. gasoline resistance, etc. insufficient. On the contrary, when the number-average molecular weight is above 30,000, the viscosity becomes too high and a larger amount of the solvent is necessitated and the formation of the thick film becomes difficult unfavorably.

The number-average molecular weight of the vinyl oligomers having an epoxy group is as described above.

The amount of the functional groups (phosphoric acid group or blocked phosphoric acid group and/or epoxy group) in the vinyl oligomer is usually 1 to 5 mol/kg-resin, preferably 2 to 4 mol/kg-resin. When it is below 1 mol/kg-resin, the crosslinking density is lowered and the scuff resistance and gasoline resistance are inclined to be reduced. On the contrary, when the amount of the functional groups is above 5 mol/kg-resin, the crosslinking density becomes too high, the weather resistance is lowered and the coating is easily cracked unfavorably.

The vinyl oligomers are obtained by polymerizing or copolymerizing a monomer having a radical-polymerizable unsaturated bonding group by a method described above.

Preferred monomers having a phosphoric acid group or blocked phosphoric acid group include vinyl-polymerizable monomers having the phosphoric acid group or blocked phosphoric acid group of the above formula (12) or (13) and the above-described radical-polymerizable unsaturated bonding group.

Preferred examples of the vinyl-polymerizable monomers having the phosphoric acid group or blocked phosphoric acid group and the radical-polymerizable unsaturated bonding group include those of the following formula (14):

(14)

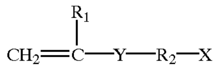

wherein $R^1$ represents a hydrogen atom or a methyl group, $R^2$ represents a divalent hydrocarbon group, Y represents —COO—, —CO—, —CONH—, a single bond or —O—, and X represents the phosphoric acid group or blocked phosphoric acid group represented by the above formula (12) or (13).

The divalent hydrocarbon groups include, for example, alkylene, cycloalkylene and arylene groups. The alkylene groups include linear or branched alkylene groups such as methylene, ethylene, propylene, butylene, isobutylene and hexamethylene groups. The cycloalkylene groups are preferably, for example, cyclopentylene and cyclohexylene groups. The arylene groups include, for example, p-, m- or p-phenylene group, naphthalene group, fluorene group, indolene group, anthracene group, furan group and thiophene group.

Particularly preferred vinyl-polymerizable monomers are acrylic monomers of the above formula (14) wherein Y is —COO—.

Preferred examples of the acrylic monomers include those of the following formulae (15) to (18):

(15)

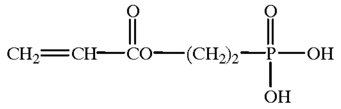

(16)

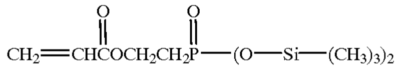

(17)

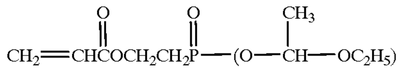

(18)

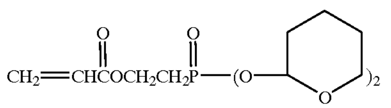

A vinyl-polymerizable monomer having a phosphoric acid group wherein the hydroxyl group of the phosphoric acid group is partially esterified may be used, if necessary. For example, the vinyl-polymerizable monomer wherein the hydroxyl group of the phosphoric acid group is partially esterified with an alkyl group such as a propyl group is usable.

The range of the vinyl-polymerizable monomers having an epoxy group is the same as that described above.

3. Curing System of an Acid Anhydride Group, a Blocked Hydroxyl Group and an Epoxy Group:

The acid anhydride group has a structure represented by the formula: —CO—O—CO—.

The blocked hydroxyl group is that obtained by blocking a hydroxyl group with the above-described blocking agent.

The vinyl oligomers used in the curing system may contain three kinds of functional groups, i.e., an acid anhydride group, a blocked hydroxyl group and an epoxy group or two of them in the same molecule.

The vinyl oligomers containing these functional groups have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are inclined to be reduced. On the contrary, when the number-average molecular weight is above 30,000, the viscosity becomes too high, a larger amount of the solvent is necessitated and the formation of the thick film becomes difficult unfavorably.

The amount of the functional groups (acid anhydride group and/or blocked hydroxyl group and/or epoxy group) in the vinyl oligomer is usually 1 to 5 mol/kg-resin, preferably 2 to 4 mol/kg-resin. When it is below 1 mol/kg-resin, the crosslinking density is lowered to reduce the solvent resistance and gasoline resistance. On the contrary, when the amount of the functional groups is above 5 mol/kg-resin, the crosslinking density becomes too high, the weather resistance is lowered and the coating is easily cracked unfavorably.

The vinyl oligomers are obtained by polymerizing or copolymerizing a monomer having a radical-polymerizable unsaturated bonding group by a method described above.

Preferred vinyl-polymerizable monomers having an acid anhydride group include those having an acid anhydride group and the above-described radical-polymerizable unsaturated bonding group. The monomers having an acid anhydride group and the radical-polymerizable unsaturated bonding group include, for example, those obtained by condensing a monomer capable of forming an acid anhydride group in the molecule such as maleic anhydride or itaconic anhydride or a monomer having a radical-polymerizable unsaturated bond and one carboxyl group in the molecule with a compound having one carboxyl group in the molecule by dehydration or dealcoholization reaction. The compound having one carboxyl group in the molecule may or may not have a radical-polymerizable unsaturated bond. These monomers include, for example, methacrylic anhydride and monomers obtained by condensing a monoester of a dibasic acid such as a monoalkyl maleate or monoalkyl itaconate by dealcoholization reaction.

Preferred monomers having a blocked hydroxyl group include vinyl-polymerizable monomers having the above-described blocked hydroxyl group and the above-described radical-polymerizable unsaturated bonding group.

Preferred examples of the vinyl-polymerizable monomers having such a blocked hydroxyl group and such a radical-polymerizable unsaturated bonding group include those of the above formula (14) wherein X represents a blocked hydroxyl group.

Preferred examples of the vinyl-polymerizable monomers having a hydroxyl group used for the preparation of the vinyl-polymerizable monomers having the blocked hydroxyl group include acrylic monomers having a hydroxyl group such as 2-hydroxyethyl (meth)acrylate, 3-hydroxypropyl (meth)acrylate, 4-hydroxybutyl (meth) acrylate and those modified with a lactone compound.

Preferred examples of the monomers having the blocked hydroxyl group include those prepared by blocking the hydroxyl group of the above-described hydroxyl group-containing monomers with the above-described blocking group, such as trimethylsiloxyethyl (meth)acrylate.

The range of the polymerizable vinyl monomers having an epoxy group is the same as that described above.

4. Curing System of an Acid Anhydride Group, a Blocked Hydroxyl Group, an Epoxy Group and a Silanol Group or Hydrolyzable Silyl Group:

The silanot group is a functional group represented by the following formula (19):

(19)

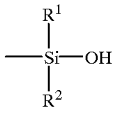

wherein $R^1$ and $R^2$ may be the same or different from each other and represent a hydroxyl group, an alkyl group, an alkoxy group, an —$NR^1R^2$ group ($R^1$ and $R^2$ being an alkyl or aryl group), an —$NR^1COR^2$ group ($R^1$ and $R^2$ being an alkyl or aryl group), a —$COR^1$ group ($R^1$ being an alkyl or aryl group), an —$OCOR^1$ group ($R^1$ being an alkyl or aryl group), an aryl group, a —$ONR^1R^2$ group ($R^1$ and $R^2$ being an alkyl or aryl group) or an —$ONCR^1R^2$ group ($R^1$ and $R^2$ being an alkyl or aryl group).

The alkyl group in the above formula is a linear or branched alkyl group having 1 to 10 carbon atoms, such as methyl, ethyl, propyl, isopropyl, butyl, isobutyl, s-butyl, t-butyl and pentyl groups. The alkoxy group is those wherein the alkyl group is the same as the above-described alkyl group. The aryl group particularly includes a substituted or unsubstituted phenyl group, the substituent being selected from halogen atoms, alkyl groups and alkoxy groups. The halogen atoms as the substituent include fluorine, chlorine, bromine and iodine atoms. The alkyl groups as the substituents include linear or branched alkyl groups having 1 to 10 carbon atoms such as methyl, ethyl, propyl, isopropyl, butyl, isobutyl, s-butyl, t-butyl and pentyl groups. The alkoxy groups as the substituent are those wherein the alkyl group is the same as the above-described alkyl group. Preferred substituents are, for example, halogen atoms such as fluorine atom, and lower alkyl groups having 1 to 5 carbon atoms.

The hydrolyzable silyl group is obtained by blocking the above-described silanol group with a hydrolyzable group and is, for example, represented by the following formula (20):

(20)

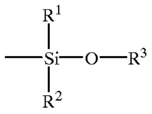

wherein $R^1$ and $R^2$ are as defined in the above formula (19), and $R^3$ represents an alkyl group, an —$NR^1R^2$ group ($R^1$ and $R^2$ being an alkyl or aryl group), a —$COR^1$ group ($R^1$ being an alkyl or aryl group), an aryl group or an —$NCR^1R^2$ group ($R^1$ and $R^2$ being an alkyl or aryl group).

The ranges of the acid anhydride group, blocked hydroxyl group and epoxy group are the same as those described above.

The vinyl oligomer used in the curing system may be those having four kinds of functional groups, i.e., the acid anhydride group, blocked hydroxyl group, epoxy group and silanol group or hydrolyzable silyl group, or three or two kinds of those four functional groups in the same molecule.

The vinyl oligomers containing these functional groups have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are reduced. On the contrary, when the number-average molecular weight is above 30,000, the viscosity becomes too high, a larger amount of the solvent is necessitated and the formation of the thick coating becomes difficult unfavorably.

The amount of the functional groups in the vinyl oligomer is usually 1 to 5 mol/kg-resin, preferably 2 to 4 mol/kg-resin. When it is below 1 mol/kg-resin, the crosslinking density is lowered to reduce the solvent resistance and gasoline resistance. On the contrary, when the amount of the functional groups is above 5 mol/kg-resin, the crosslinking density becomes too high, the weather resistance is lowered and the coating is easily cracked unfavorably.

The vinyl oligomers are obtained by polymerizing or copolymerizing a monomer having a radical-polymerizable unsaturated bonding group by a method described above.

Preferred examples of the vinyl-polymerizable monomers having a silanol group or hydrolyzable silyl group include those having such a functional group and the above-described radical-polymerizable unsaturated bonding group.

Preferred examples of the vinyl-polymerizable monomers having a silanol group or hydrolyzable silyl group include acrylic monomers of the above formula (14) wherein X represents a silanol group or hydrolyzable silyl group.

Examples of these acrlic monomers include γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropylmethyldimethoxysilane, γ-(meth)acryoyloxypropylmethyldiethoxysilane, γ-(meth)acryloyoypropylmethyldipropoxysilane, γ-(meth)acryloyloxybutylphenyldimetoxysilane, γ-(meth)acryoyloxyphenyldiethoxysilane, γ-(meth)acryloyloxyphenyldipropoxysilane, γ-(meth)acryloyloxypropyldimethylmethoxysilane, γ-(meth)acryloyloxypropyldimethylmethoxysilane, γ-(meth)acryloyloxypropylphenylmethylmethoxysilane, γ-(meth)acryloyloxypropylphenylmethylethoxysilane, γ-(meth)acryloyloxypropyltrisilanol, γ-(meth)acryloyloxypropylmethyldihydroxysilane, γ-(meth)acryloyloxybutylphenyldihydroxysilane, γ-(meth)acryloyloypropyldimethylhydroxysilane and γ-(meth)acryloyloxypropylphenylmethylhydroxysilane.

The range of the vinyl-polymerizable monomers having the acid anhydride group, blocked hydroxyl group and epoxy group is the same as that described above.

5. Curing System of an Acetoacetyl Group and a Vinyl (thio)ether Group:

The acetoacetyl group is a functional group represented by the formula: $CH_3$—CO—$CH_2$CO—. This functional group is present in the form of a keto-enol tautomer in the paint composition. Therefore, the acetoacetyl group has properties of both a ketone group and a hydroxyl group.

The vinyl (thio)ether group is represented by the following formula (21):

—X—CH=CH—Y (21)

wherein X represents an oxygen atom or a sulfur atom and Y represents a hydrogen atom or a single bond.

When Y in the above formula (21) is a hydrogen atom, the group is an aliphatic vinyl (thio)ether group and, on the contrary, when Y is a single bond, the group is a cyclic vinyl (thio)ether group.

Examples of the aliphatic vinyl (thio)ethers include methyl vinyl ether group, ethyl vinyl ether group, n-propyl vinyl ether group, isopropyl vinyl ether group, 2-ethylhexyl vinyl ether group and cyclohexyl vinyl ether group, and also corresponding thioether groups.

Preferred cyclic vinyl (thio)ether groups include, for example, furan rings (such as 2,3-dihydrofuran and 3,4-dihydrofuran), pyran rings (such as those derived from 2,3-dihydro-2H-pyran, 3,4-dihydro-2H-pyran, 3,4-dihydro-2-methoxy-2H-pyran, 3,4-dihydro-4,4-dimethyl-2H-pyrane-2-on, 3,4-dihydro-2-ethoxy-2H-pyran and sodium 3,4-dihydro-2H-pyran-2-carboxylate) and those derived from sulfur-containing cyclic groups.

The vinyl oligomers containing these functional groups have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are inclined to be reduced. On the contrary, when the number-average molecular weight is above 30,000, the viscosity becomes too high, a larger amount of the solvent is necessitated and the formation of the thick coating becomes difficult unfavorably.

The amount of the functional groups in the vinyl oligomer is usually 1 to 5 mol/kg-resin, preferably 2 to 4 mol/kg-resin. When it is below 1 mol/kg-resin, the crosslinking density is lowered and the solvent resistance and gasoline resistance are reduced. On the contrary, when the amount of the functional groups is above 5 mol/kg-resin, the crosslinking density becomes too high, the weather resistance is lowered and the coating is easily cracked unfavorably.

The vinyl oligomers are obtained by polymeri zing or copolymerizing a monomer having a radical-polymerizable unsaturated bonding group by a method described above.

Preferred examples of the monomers having an acetoacetyl group and a radical-polymerizable unsaturated bonding group include those represented by the following formula (22):

(22)

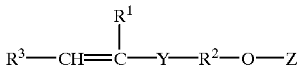

wherein $R^1$ and $R^3$ each represent a hydrogen atom or an alkyl group having 1 to 6 carbon atoms, $R^2$ represents an alkylene group, a cycloalkylene group, an arylene group or a single bond, Y represents —COO—, —CO—, —O—, —CONH— or single bond, and Z represents an acetoacetyl group. Among them, acrylic monomers of the above formula wherein Y represents —COO— is particularly preferred from the viewpoint of the radical polymerizability.

The vinyl-polymerizable monomers having an acetoacetyl group include, for example, acetoacetoxyethyl (meth)acrylate, acetoacetoxypropyl (meth)acrylate, acetacetoxyethyl crotonate, acetacetoxypropyl crotonate, allyl acetoacetate, N-(2-acetoacetoxyethyl) (meth)acrylamide and vinyl acetoacetate.

The monomers having an acetoacetyl group are preferably (meth) acryl monomers of the above formula wherein $R^3$ is a hydrogen atom and Y is —COO—. These monomers include, for example, acetoacetoxyalkyl (meth) acrylates such as 2-acetoacetoxyethyl (meth)acrylate, 3-acetoacetoxypropyl (meth)acrylate and 4-acetoacetoxybutyl (meth)acrylate.

These monomers having an acetoacetyl group are synthesized by a technique well known in the art. For example, they can be synthesized by acetoacetylating an α, β-ethylenically unsaturated monomer having a hydroxyl group with an acetoacetic ester or diketene.

The polymerizable vinyl monomers having a vinyl (thio) ether group include, for example, vinyl-polymerizable monomers having a vinyl (thio)ether group and the above-described radical-polymerizable unsaturated bonding group. Such a vinyl-polymerizable monomer can be produced by, for example, reacting a compound having a vinyl (thio)ether group and a functional group with a vinyl-polymerizable monomer having a functional group reactive with said functional group.

For example, the vinyl-polymerizable monomer having a vinyl (thio)ether group can be produced by reacting 2,3-dihydro-2H-furan-2-ylmethyl 2,3-dihydro-2H-furancarboxylate or 3,4-dihydro-2H-pyran-2-ylmethyl 3,4-dihydro-2H-pyrancarboxylate with a polymerizable vinyl monomer having a hydroxyl group such as 2-hydroxyethyl (meth)acrylate.

The compounds having a vinyl (thio)ether group usable for the curing system, in addition to the vinyl oligomer, include oligomers obtained by reacting a polyol such as trimethylolpropane with a compound having two or more vinyl (thio)ether groups, e.g., 3,4-dihydro-2H-pyran-2-ylmethyl 3,4-dihydro-2H-pyran-2-carboxylate.

6. Curing System of a Blocked Carboxyl Group and a Vinyl (thio)ether Group:

The ranges of the blocked carboxyl group and vinyl (thio)ether groups are the same as those described above.

The vinyl oligomers containing these functional groups have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are reduced. On the contrary, when the number-average molecular weight is above 30,000, the viscosity becomes too high, a larger amount of the solvent is necessitated and the formation of the thick coating becomes difficult unfavorably.

The amount of the functional groups in the vinyl oligomer is usually 1 to 5 mol/kg-resin, preferably 2 to 4 mol/kg-resin. When it is below 1 mol/kg-resin, the crosslinking density is lowered and the solvent resistance and gasoline resistance are reduced. On the contrary, when the amount of the functional groups is above 5 mol/kg-resin, the crosslinking density becomes too high, the weather resistance is lowered and the coating is easily cracked unfavorably.

The vinyl oligomers having a blocked carboxyl group or vinyl (thio)ether group are obtained by polymerizing or copolymerizing a monomer having a radical-polymerizable unsaturated bonding group by a method described above. The range of the compounds having the vinyl (thio)ether group is the same as that described above.

7. Curing System of a Silyl-blocked Phosphoric Acid Group and Vinyl (thio)ether Group:

The ranges of the silyl-blocked phosphoric acid groups and vinyl (thio)ether groups are the same as those described above.

The vinyl oligomers containing these functional groups have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are reduced. On the contrary, when the number-average molecular weight is above 30,000, the viscosity becomes too high, a larger amount of the solvent is necessitated and the formation of the thick coating becomes difficult unfavorably.

The amount of the functional groups in the vinyl oligomer is usually 1 to 5 mol/kg-resin, preferably 2 to 4 mol/kg-resin. When it is below 1 mol/kg-resin, the crosslinking density is lowered and the solvent resistance and gasoline resistance are reduced. On the contrary, when the amount of the functional groups is above 5 mol/kg-resin, the crosslinking density becomes too high, the weather resistance is lowered and the coating is easily cracked unfavorably. The range of the compounds having the vinyl (thio)ether group is the same as that described above.

The vinyl oligomers are obtained by polymerizing or copolymerizing a monomer having the radical-polymerizable unsaturated bonding group by a method described above.

The ranges of the vinyl oligomers and compounds having the vinyl (thio)ether group are the same as those described above.

8. Curing System of an Alicyclic Epoxy Group Used Singly:

This curing system comprises an oligomer having an alicyclic epoxy group.

The alicyclic epoxy group is a five-membered or six-membered alicyclic hydrocarbon group (which may contain a crosslinked hydrocarbon group) in which an oxygen atom is bonded to carbon atoms adjacent to each other in the ring to form an epoxy group.

The polymerizable vinyl oligomers containing the alicyclic epoxy group have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are inclined to be reduced. On the contrary, when the number-average molecular weight is above 30,000, the viscosity becomes too high, a larger amount of the solvent is necessitated and the formation of the thick coating becomes difficult unfavorably.

The amount of the functional groups in the vinyl oligomer is usually 1 to 5 mol/kg-resin, preferably 2 to 4 mol/kg-resin. When it is below 1 mol/kg-resin, the crosslinking density is lowered and the solvent resistance and gasoline resistance are reduced. On the contrary, when the amount of the functional groups is above 5 mol/kg-resin, the crosslinking density becomes too high, the weather resistance is lowered and the coating is easily cracked unfavorably.

The vinyl oligomer containing an alicyclic epoxy group can be produced by polymerizing or copolymerizing a monomer having an alicyclic epoxy group by a method described above. Preferred monomers include, for example, vinyl-polymerizable monomers having such an alicyclic epoxy group and the above-described radical-polymerizable unsaturated bonding group.

Preferred examples of the vinyl oligomer containing an alicyclic epoxy group include those of the above formula (14) wherein X is an alicyclic epoxy group. Examples of the vinyl-polymerizable monomers include those of the following formulae (23) and (24):

(23)

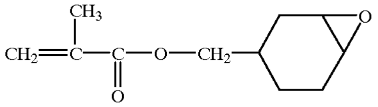

-continued (24)

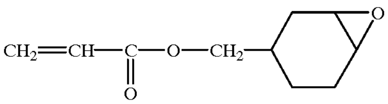

The monomer represented by the above formula (23) is available on the market under the trade name of Cyclomer M 100 (a product of Daicel Chemical Industries, Ltd.), and the monomer represented by the above formula (24) is also available under the trade name of Cyclomer M 200 (a product of Daicel Chemical Industries, Ltd.).

9. Curing System of a Hydrolyzable Silyl Group and an Alicyclic Epoxy Group:

This curing system comprises functional groups, i.e., a hydrolyzable silyl group and an alicyclic epoxy group.

The ranges of the hydrolyzable silyl groups and alicyclic epoxy groups are the same as those described above.

The vinyl oligomers containing these functional groups have a number-average molecular weight (Mn) of usually 600 to 30,000, preferably 800 to 20,000. When the number-average molecular weight is below 600, the oligomers having no functional group in the molecule are inclined to be formed, the crosslinking becomes insufficient and the gasoline resistance and scuff resistance are reduced. On the contrary, when the number-average molecular weight is above 30,000, the viscosity becomes too high, a larger amount of the solvent is necessitated and the formation of the thick coating becomes difficult unfavorably.

The amount of the functional groups in the vinyl oligomer is usually 1 to 5 mol/kg-resin, preferably 2 to 4 mol/kg-resin. When it is below 1 mol/kg-resin, the crosslinking density is lowered and the solvent resistance and gasoline resistance are reduced. On the contrary, when the amount of the functional groups is above 5 mol/kg-resin, the crosslinking density becomes too high, the weather resistance is lowered and the coating is easily cracked unfavorably.

The vinyl oligomer can be produced by polymerizing or copolymerizing a vinyl-polymerizable monomer having the functional groups by a method described above. The range of the monomers is the same as that described above.

The oligomers and/or compounds having the above functional groups are used for forming a clear coating paint, as it is or, if necessary, together with various components.

For example, the clear coating paint may contain, if necessary, dissociation catalysts for accelerating the dissociation of the blocking agent from the blocked carboxyl group, blocked phosphoric acid group, blocked hydroxyl group, etc. However, the curing catalyst for the clear coating paint is not incorporated into the clear coating paint.

The dissociation catalysts include, for example, weak acid dissociation catalysts such as phosphoric acid monoesters and diesters. The phosphoric acid monoesters include, for example, monooctyl phosphate, and the phosphoric acid diesters include. for example, dibutyl phosphate.

The clear coating paint can suitably contain various additives usually used in the technical field of paintings such as a pigment, an anti-sagging agent, an anti-settling agent, a levelling agent, a dispersing agent, a defoaming agent, a ultraviolet absorber, a light stabilizer, an antistatic agent and a thinner. These additives are the same as those described above with reference to the base coating painting.

The coating method for the clear coating paint is also the same as that for that for the base coating paint except that the clear coating paint is coated on the coating of the base coating paint by the wet-on-wet technique.

The thickness of the clear coating paint (after drying) to be formed on the base coating paint by the wet-on-wet technique is usually 15 to 100 $\mu$m, preferably 25 to 60 $\mu$m.

The following Examples, Application Examples, etc will further illustrate the present invention.

1. Synthesis of Vinyl-polymerizable Monomer Having a Cyclic Vinyl Ether Group (monomer C):

REFERENCE EXAMPLE 1

600 parts of methyl ethyl ketone and 224 parts of 2-hydroxyethyl methacrylate were fed into a four-necked flask provided with a dropping funnel, stirrer, inert gas-inlet and thermometer, and stirred. A mixture of 200 parts of 3,4-dihydro-2H-pyran-2-yl-methyl 3,4-dihydro-2 H-pyran-2-carboxylate and 5 parts of p-toluenesulfonic acid was dropped into the flask for a period of 30 minutes at room temperature. After the completion of the dropping, the reaction was conducted at room temperature for 24 hours. The reaction solution was fed into a separating funnel and washed with alkali by adding a 10% aqueous sodium hydrogencarbonate solution thereto. After completion of washing, the product was further repeatedly washed with 200 parts of deionized water until pH of the water after washing had become 7. Molecular Sieve 4A/16 (a product of Wako Pure Chemical Industries, Ltd.) was added to the organic layer. The product was dried at room temperature for 3 days and then methyl ethyl ketone was removed under reduced pressure to obtain monomer C.

2. Synthesis of Vinyl Oligomer for Base Coating Paint:

REFERENCE EXAMPLE 2

A predetermined amount of xylene as shown in the item "Starting material" in Table 1 given below was fed into a four-necked flask provided with a stirrer, inert gas-inlet, thermometer and condenser. The temperature was elevated to a reaction temperature of 140°C. (or 80° C. for vinyl oligomers V1 and V2). A mixture of the starting monomers and a polymerization catalyst in relative amounts given in the item "Starting material" in Table 1 were dropped therein. After keeping the temperature at the reaction temperature for 4 h, the synthesis was stopped to obtain a vinyl oligomer having a predetermined solid content. The amount of a hydroxyl group in the resultant vinyl oligomer and the number-average molecular weight thereof are also given in Table 1.

TABLE 1

| | Oligomer for base coating paint | | | | | | |
|---|---|---|---|---|---|---|---|
| Oligomer | BA1 | BA2 | BA3 | BA4 | BA5 | BA6 | BA7 |
| Properties of oligomer | | | | | | | |
| Amount of hydroxyl group (mol/kg-resin) | 3.0 | 2.0 | 1.0 | 0.8 | 2.8 | 0.8 | 1.0 |
| Number-average molecular weight | 1300 | 2600 | 4000 | 6000 | 8000 | 15000 | 20000 |
| Solid content (%) | 90 | 50 | 50 | 50 | 50 | 40 | 30 |
| Starting material | | | | | | | |
| Xylene | 675 | 250 | 250 | 250 | 250 | 250 | 250 |
| Methyl methacrylate | 42 | 40 | 40 | 70 | | 70 | 40 |
| Styrene | 40 | 37 | 40 | 30 | | 30 | 40 |
| 2-Hydroxyethyl methacrylate | 98 | 33 | | | | | |
| Placcel FM-2 | | 90 | 90 | | 250 | | 90 |
| Placcel FM-4 | | | | 117 | | 117 | |
| Butyl acrylate | 70 | 50 | 80 | 33 | | 33 | 80 |
| Acrylic acid | 2 | 2 | 2 | 2 | 2 | 2 | 2 |
| Azobisisobutyronitrile | 31 | 30 | 20 | 15 | 12 | 5 | 3 |
| Di-t-butyl peroxide | 5 | 5 | 5 | 5 | 6 | 20 | 25 |

3. Preparation of Base Coating Paint

Base coating paints having the compositions given in Table 2 given below were prepared.

The compounds represented by the trade names and used herein are as follows:

FR-606: an aluminum paste (product of Asahi Chemical Industry Co., Ltd.)

Cymel 370: a methylolated monomeric melamine (product of Mitsui Cytec),

Cymel 325: an iminated monomeric melamine (product of Mitsui Cytec),

Cymel 303: an alkoxylated melamine (product of Mitsui Cytec),

Uvan 122: melamine (product of Mitsui Toatsu Chemicals, Inc.).

TABLE 2

| Component | Base coating paint | | | | | | | | |
|---|---|---|---|---|---|---|---|---|---|
| | bb1 | bb2 | bb3 | bb4 | bb5 | bb6 | bb7 | bb8 | bb9 |
| BA1 | 44 | | | | | | | | |
| BA2 | | 80 | | | | | | | |
| BA3 | | | 80 | | | | | 80 | 80 |
| BA4 | | | | 80 | | | | | |
| BA5 | | | | | 80 | | | | |
| BA6 | | | | | | 100 | | | |
| BA7 | | | | | | | 133 | | |
| FR-606C | 10 | 10 | 10 | 10 | 10 | 10 | 10 | | |
| Toluene | 10 | 10 | 10 | 10 | 10 | 10 | 10 | | |
| CAB 381-2 * | | | 5 | 5 | 5 | 5 | 5 | | |
| Butyl acetate | | | 10 | 10 | 10 | 10 | 10 | | |
| MG 100S | 5 | 5 | | | | | | | |
| Uvan 122 | | | 29 | 29 | 20 | 29 | | | |
| Cymel 327 | 17 | 17 | | | | | | | |
| Superbekamine L116-70 | | | | | | | | 14 | 14 |
| Sanduvor 3206 | 1 | 1 | 1 | 1 | 1 | 1 | 1 | 1 | 1 |
| Sanduvor 3058 (×10) | 5 | 5 | 5 | 5 | 5 | 5 | 5 | 5 | 5 |
| KP 321 ($\times 10^2$) | 5 | 5 | 5 | 5 | 5 | 5 | 5 | 5 | 5 |
| N,N-Diethylbenzylamine (bp. 210° C.) | 3 | | | | | | | | |
| N,N-Dimethylhexylamine (bp. 155° C.) | | 3 | | | | | | 4 | |
| Tripropylamine (bp. 156° C.) | | | 2 | | | | | | |
| 1-Methylimidazole (bp. 195° C.) | | | | 2 | | | | | |
| Trilaurylmethylammonium acetate (bp. 150° C. or above) | | | | | 5 | | | | |
| N,N-Dimethyloctylamine | | | | | | 5 | | | |
| N,N-Dimethylaminopropyl-acrylamide (bp. 150° C. or above) | | | | | | | 4 | | 5 |

| Component | Base coating paint | | | | |
|---|---|---|---|---|---|
| | bb10 | bb11 | bb12 | bb13 | bb14 |
| BA3 | 80 | 80 | 80 | 80 | 80 |
| CAB 381-2 | 5 | 5 | 5 | 5 | 5 |
| Butyl acetate | 10 | 10 | 10 | 10 | 10 |
| Uvan 122 | | 17 | 17 | 17 | |
| Burnock 901 S | | | | | 10 |
| Superbekamine L116-70 | 14 | | | | |
| Sanduvor 3206 | 1 | 1 | 1 | 1 | 1 |
| Sanduvor 3058 (×10) | 5 | 5 | 5 | 5 | 5 |
| KP 321 ($\times 10^2$) | 5 | 5 | 5 | 5 | 5 |
| N,N-Diethylbenzylamine (bp. 210° C.) | | | | | 4 |
| N,N-dimethyldodecylamine | 5 | 5 | 5 | 5 | |

| Component | Base coating paint | | | | | | | | |
|---|---|---|---|---|---|---|---|---|---|
| | bc1 | bc2 | bc3 | bc4 | bc5 | bc6 | bc7 | bc8 | bc9 |
| BA1 | 44 | | | | | | | | |
| BA2 | | 80 | | | | | | | |
| BA3 | | | 80 | | | | | 80 | 80 |
| BA4 | | | | 80 | | | | | |
| BA5 | | | | | 80 | | | | |
| BA6 | | | | | | 100 | | | |
| BA7 | | | | | | | 133 | | |
| FR-606C | 10 | 10 | 10 | 10 | 10 | 10 | 10 | | |
| Toluene | 10 | 10 | 10 | 10 | 10 | 10 | 10 | | |
| CAB 381-2 * | | | 5 | 5 | 5 | 5 | 5 | 5 | 5 |
| Butyl acetate | | | 10 | 10 | 10 | 10 | 10 | 10 | 10 |
| MG 100S | 5 | 5 | | | | | | | |
| Uvan 122 | | | 29 | 29 | 29 | 29 | 29 | | |
| Cymel 327 | 17 | 17 | | | | | | | |
| Burnock 901S | | | | | | | | | |
| Superbekamine L116-70 | | | | | | | | 14 | 14 |
| Sanduvor 3206 | 1 | 1 | 1 | 1 | 1 | 1 | 1 | 1 | 1 |
| Sanduvor 3058 (×10) | 5 | 5 | 5 | 5 | 5 | 5 | 5 | 5 | 5 |
| KP 321 ($\times 10^2$) | 5 | 5 | 5 | 5 | 5 | 5 | 5 | 5 | 5 |
| Heptanoic acid (bp. 223° C.) | 5 | 5 | 5 | | | | 4 | 4 | 4 |

TABLE 2-continued

| | | | |
|---|---|---|---|
| Monooctyl phosphate (bp. 150° C. or above) | 3 | | |
| Dibutyl phosphate (bp. 150° C. or above) | | 5 | |
| Octanoic acid (bp. 239° C. or above) | | | 3 |

| | Base coating paint | | | | |
|---|---|---|---|---|---|
| Component | bc10 | bc11 | bc12 | bc13 | bc14 |
| BA3 | 80 | 80 | 80 | 80 | 80 |
| CAB 381-2 | 5 | 5 | 5 | 5 | 5 |
| Butyl acetate | 10 | 10 | 10 | 10 | 10 |
| Uvan 122 | | 17 | 17 | 17 | |
| Burnock 901 S | | | | | 10 |
| Superbekamine L116-70 | 14 | | | | |
| Sanduvor 3206 | 1 | 1 | 1 | 1 | 1 |
| Sanduvor 3058 (×10) | 5 | 5 | 5 | 5 | 5 |
| KP 321 ($\times 10^2$) | 5 | 5 | 5 | 5 | 5 |
| Heptanoic acid (bp. 223° C.) | 4 | 4 | 4 | | |
| San-aid SIL 100 | | | | 4 | |
| Trisacetylacetonatoaluminum (bp. 150° C. or above) | | | | | 4 |

Note)
CAB 381-2: cellulose acetate butyrate (a product of Eastman Kodak Co.)

4. Preparation of Comparative Base Coating Paint

Comparative base coating paints having the compositions given in Table 3 given below were prepared in the same manner as that described above.

TABLE 3

| | Comparative base coating paint | | | | | | | | | |
|---|---|---|---|---|---|---|---|---|---|---|
| Component | Hb1 | Hb2 | Hb3 | Hb4 | Hc1 | Hc2 | Hc3 | Hc4 | Hd1 | Hd2 |
| BA1 | 44 | 44 | | | 44 | 44 | | | 44 | |
| BA3 | | | 80 | 80 | | | 80 | 80 | | 80 |
| FR-606C | 10 | 10 | 10 | 10 | 10 | 10 | 10 | 10 | 10 | 10 |
| Toluene | 10 | 10 | 10 | 10 | 10 | 10 | 10 | 10 | 10 | 10 |
| MG 100S | 5 | 5 | | | 5 | 5 | | | 5 | |
| CAB 381-2 | | | 5 | 5 | | | 5 | 5 | | 5 |
| Butyl acetate | | | 10 | 10 | | | 10 | 10 | | 10 |
| Uvan 122 | | | 29 | 29 | | | 29 | 29 | | 29 |
| Cymel 325 | 17 | 17 | | | 17 | 17 | | | 17 | |
| Sanduvor 3206 | 1 | 1 | 1 | 1 | 1 | 1 | 1 | 1 | 1 | 1 |
| Sanduvor 3058 (×10) | 5 | 5 | 5 | 5 | 5 | 5 | 5 | 5 | 5 | 5 |
| KP 321 ($\times 10^2$) | 5 | 5 | 5 | 5 | 5 | 5 | 5 | 5 | 5 | 5 |
| Triethylamine(*1) | 5 | | | 5 | | | | | | |
| N,N-Dimethylethanol-(*2) amine | | 3 | 3 | | | | | | | |
| Propionic acid(*3) | | | | | 3 | | | 5 | | |
| Acrylic acid(*4) | | | | | | 5 | 3 | | | |

Note)
Boiling points of triethylamine, N,N-dimethylethanolamine, propionic acid and acrylic acid are 88, 133, 141 and 141° C., respectively, all of which are below 150° C.

5. Preparation of Oligomer for Clear Coating Paint

Vinyl oligomers for clear coating paints, having oligomer characteristics shown in Table 4 and also having the compositions given in the same table were prepared in the same manner as that of Reference Example 2.

TABLE 4

(Oligomer for clear coating paint)

| Oligomer | A1 | A2 | B1 | B2 | C1 | C2 | D1 |
|---|---|---|---|---|---|---|---|
| Properties of oligomer | | | | | | | |
| Amount of functional group (mol/kg-resin) | | | | | | | |
| Hydrolyzable silyl group | 1.0 | 0.5 | | | 1.5 | 1.0 | 1.5 |
| Acid anhydride group | 1.0 | 0.5 | 1.0 | 0.7 | 1.0 | 0.5 | |
| Epoxy group | 1.0 | 0.5 | 1.0 | 0.7 | | | 1.0 |
| Blocked hydroxyl group | 1.0 | 0.5 | 1.5 | 1.0 | 2.0 | 1.0 | 2.0 |
| Number-average molecular weight | 1200 | 4000 | 1100 | 5000 | 1500 | 3500 | 1100 |
| Starting materials | | | | | | | |
| Xylene | 675 | 250 | 675 | 250 | 675 | 250 | 675 |
| γ-Methacryloyloxypropyl-trimethoxysilane | 62 | 31 | | | 93 | 62 | 93 |
| Glycidyl methacrylate | 36 | 18 | 36 | 25 | | | 36 |
| Itaconic anhydride | 28 | 14 | 28 | 20 | 28 | 14 | |
| Trimethylsiloxyethyl methacrylate | 47 | 23 | 69 | 46 | 93 | 47 | 93 |
| Styrene | 25 | 65 | 75 | 95 | 18 | 59 | 18 |
| Butyl acrylate | 16 | 62 | 4 | 36 | | 30 | |
| 2-Ethylhexyl methacrylate | 36 | 37 | 38 | 38 | 19 | 39 | 29 |
| t-Butyl peroxy-2-ethylhexanoate | 23 | 8 | 26 | 7 | 12 | 15 | 24 |
| Di-t-butyl peroxide | 1.0 | 2.0 | 2.0 | 1.5 | 1.0 | 1.0 | 1.0 |
| Solid content (%) | 90 | 50 | 90 | 50 | 90 | 50 | 90 |

| Oligomer | D2 | E1 | E2 | F1 | F2 | G1 | G2 |
|---|---|---|---|---|---|---|---|
| Properties of oligomer | | | | | | | |
| Amount of functional group (mol/kg-resin) | | | | | | | |
| Hydrolyzable silyl group | 1.0 | | | | | 1.0 | 0.7 |
| Acid anhydride group | | 1.5 | 1.0 | | | 1.0 | 0.7 |
| Epoxy group | 0.7 | | | 1.5 | 1.0 | 1.0 | 0.7 |
| Blocked hydroxyl group | 1.0 | 2.0 | 1.0 | 1.5 | 1.0 | | |
| Number-average molecular weight | 8000 | 1500 | 9000 | 2000 | 4000 | 1600 | 3500 |
| Starting materials | | | | | | | |
| Xylene | 250 | 675 | 250 | 675 | 250 | 675 | 250 |
| γ-Methacryloyloxypropyl-trimethoxysilane | | | | | | 62 | 43 |
| Glycidyl methacrylate | 25 | | | 53 | 36 | 36 | 25 |
| Itaconic anhydride | | 42 | 28 | | | 28 | 20 |
| Trimethylsiloxyethyl methacrylate | 46 | 93 | 47 | 69 | 46 | | |
| Styrene | 56 | 50 | 81 | 50 | 70 | 45 | 65 |
| Butyl acrylate | 30 | 25 | 55 | 40 | 61 | 42 | 60 |
| 2-Ethylhexyl methacrylate | 49 | 40 | 40 | 37 | 38 | 37 | 37 |
| t-Butyl peroxy-2-ethylhexanoate | 6 | 12 | 6 | 11 | 9 | 12 | 15 |
| Di-t-butyl peroxide | 2.0 | 1.0 | 2.0 | 1.0 | 1.0 | 1.0 | 1.5 |
| Solid content (%) | 50 | 90 | 50 | 90 | 50 | 90 | 50 |

| Oligomer | H1 | H2 | I1 | I2 | J1 | J2 |
|---|---|---|---|---|---|---|
| Properties of oligomer | | | | | | |
| Amount of functional group (mol/kg-resin) | | | | | | |
| Hydrolyzable silyl group | 0.5 | 0.5 | | | 2.0 | 1.0 |
| Acid anhydride group | | | 1.5 | 1.0 | 1.5 | 1.0 |
| Epoxy group | | | 1.5 | 1.0 | | |
| Blocked hydroxyl group | 2.0 | 1.0 | | | | |
| Number-average molecular weight | 1800 | 3000 | 1200 | 3500 | 1000 | 3500 |
| Starting materials | | | | | | |
| Xylene | 675 | 250 | 675 | 250 | 675 | 250 |
| γ-Methacryloyloxypropyl-trimethoxysilane | 31 | 31 | | | 123 | 61 |
| Glycidyl methacrylate | | | 53 | 36 | | |
| Itaconic anhydride | | | 42 | 28 | 42 | 28 |
| Trimethylsiloxyethyl methacrylate | 93 | 47 | | | | |
| Styrene | 50 | 77 | 50 | 72 | 50 | 96 |
| Butyl acrylate | 26 | 46 | 63 | 73 | | 30 |
| 2-Ethylhexy methacrylate | 50 | 50 | 43 | 43 | 36 | 36 |
| t-Butyl peroxy-2-ethylhexanoate | 11 | 15 | 23 | 12 | 37 | 13 |
| Di-t-butyl peroxide | 2.0 | 2.0 | 1.0 | 2.0 | 2.0 | 2.0 |
| Solid content (%) | 90 | 50 | 90 | 50 | 90 | 50 |

TABLE 4-continued (Oligomer for clear coating paint)

| Oligomer | K2 | K1 | L1 | L2 | M1 | M2 | N1 |
|---|---|---|---|---|---|---|---|
| Properties of oligomer<br>Amount of functional group (mol/kg-resin) | | | | | | | |
| Hydrolyzable silyl group | 2.0 | 1.0 | 2.5 | 1.5 | | | |
| Acid anhydride group | | | | | 3.0 | 2.0 | |
| Epoxy group | 1.5 | 1.0 | | | | | 4.0 |
| Number-average molecular weight | 1000 | 3200 | 1300 | 4000 | 1600 | 3000 | 1200 |
| Starting materials | | | | | | | |
| Xylene | 675 | 250 | 675 | 250 | 675 | 250 | 675 |
| γ-Methacryloyloxypropyl-trimethoxysilane | 124 | 62 | 155 | 93 | | | |
| Glycidyl methacrylate | 53 | 35 | | | | | |
| Itaconic anhydride | | | | | 84 | 56 | |
| Styrene | 35 | 75 | 64 | 95 | 75 | 93 | 25 |
| Butyl acrylate | | 20 | | 31 | 41 | 51 | 45 |
| 2-Ethylhexyl methacrylate | 38 | 58 | 31 | 31 | 50 | 50 | 38 |
| t-Butyl peroxy-2-ethylhexanoate | 38 | 20 | 21 | 13 | 24 | 18 | 21 |
| Di-t-butyl peroxide | 2.0 | 1.5 | 1.2 | — | 2.0 | 1.0 | 2.0 |
| Solid content (%) | 90 | 50 | 90 | 50 | 90 | 50 | 90 |

| Oligomer | N2 | O1 | O2 | P1 | P2 | Q1 | Q2 |
|---|---|---|---|---|---|---|---|
| Properties of oligomer<br>Amount of functional group (mol/kg-resin) | | | | | | | |
| Epoxy group | 3.0 | | | | | | 1.0 |
| Blocked hydroxyl group | | 3.0 | 2.0 | | | 2.0 | |
| Blocked carboxyl group | | | | 3.0 | 2. 0 | 2.0 | 1.0 |
| Number-average molecular weight | 5000 | 1700 | 6000 | 1100 | 3500 | 1500 | 4500 |
| Starting materials | | | | | | | |
| Xylene | 250 | 675 | 250 | 675 | 250 | 675 | 250 |
| Glycidyl methacrylate | 107 | | | | | 71 | 36 |
| Trimethylsiloxyethyl methacrylate | | 137 | 91 | | | | |
| Styrene | 45 | 50 | 76 | 50 | 70 | 30 | 71 |
| Butyl acrlyate | 60 | 50 | 70 | 50 | 66 | 30 | 60 |
| Monomer A * | | | | 107 | 71 | 72 | 36 |
| 2-Ethylhexyl methacrylate | 38 | 13 | 13 | 43 | 43 | 47 | 47 |
| t-Butyl peroxy-2-ethylhexanoate | 10 | 12 | 7 | 35 | 18 | 25 | 10 |
| Di-t-butyl peroxide | 1.2 | 1.5 | 1.5 | 1.5 | 1.5 | 1.5 | 1.5 |
| Solid content (%) | 50 | 90 | 50 | 90 | 50 | 90 | 50 |

| Oligomer | R1 | R2 | S1 | S2 | T1 | T2 |
|---|---|---|---|---|---|---|
| Properties of oligomer<br>Amount of functional group (mol/kg-resin) | | | | | | |
| Hydrolyzable silyl group | 2.0 | 1.0 | 1.0 | 1.0 | | |
| Epoxy group | | | 1.5 | 1.0 | | |
| Blocked carboxyl group | 2.0 | 1.0 | 1.5 | 1.0 | | |
| Carboxyl group | | | | | 3.0 | 2.0 |
| Number-average molecular weight | 2000 | 3000 | 1000 | 4000 | 1200 | 3000 |
| Starting materials | | | | | | |
| Xylene | 675 | 250 | 675 | 250 | 675 | 250 |
| γ-Methacryloyloxypropyl-trimethoxysilane | 124 | 62 | 62 | 62 | | |
| Glycidyl methacrylate | | | 53 | 35 | | |
| Styrene | 20 | 50 | 41 | 67 | 10 | 43 |
| Butyl acrylate | 20 | 50 | | | | 30 |
| 2-Ethylhexyl methacrylate | 14 | 52 | 40 | 50 | 20 | 30 |
| Monomer A * | 72 | 36 | 54 | 36 | | |
| Monomer B * | | | | | 220 | 147 |
| t-Butyl peroxy-2-ethylhexanoate | 11 | 18 | 40 | 15 | 32 | 18 |
| Di-t-butyl peroxide | 1.5 | 1.0 | 1.5 | 1.5 | 2.0 | 1.0 |
| Solid content (%) | 90 | 50 | 90 | 50 | 90 | 50 |

Note)
Monomer A is trimethylsilyl acrylate.
The monomer B is a vinyl-polymerizable monomer having a blocked phosphoric acid group and represented by the following structural formula:

TABLE 4-continued (Oligomer for clear coating paint)

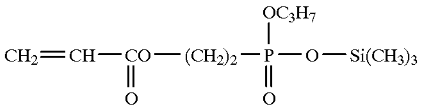

| Oligomer | U1 | U2 | V1 | V2 | W1 | W2 |
|---|---|---|---|---|---|---|
| Properties of oligomer | | | | | | |
| Amount of functional group (mol/kg-resin) | | | | | | |
| Epoxy group | 2.0 | 1.0 | | | | |
| Blocked phosphoric acid group | 2.0 | 1.0 | | | | |
| Carboxyl group | | | | | 2.0 | 1.0 |
| Vinyl ether group | | | 1.9 | 7.8 | | |
| Number-average molecular weight | 1100 | 3500 | 1500 | 1300 | 2000 | 4000 |
| Starting materials | | | | | | |
| Cyclohexanone | | | | | 300 | 150 |
| Xylene | 675 | 250 | 675 | 250 | 375 | 100 |
| Glycidyl methacrylate | 70 | 35 | | | | |
| Styrene | 10 | 50 | 20 | | 100 | 100 |
| Butyl acrylate | | 50 | | | 70 | 88 |
| 2-Ethylhexyl methacrylate | 20 | 41 | | | 44 | 44 |
| Monomer B | 147 | 74 | | | | |
| Monomer C | | | 230 | | | |
| Trimethylolpropane | | | | 134 | | |
| Monomer D* | | | | 384 | | |
| Dodecylbenzenesulfonic acid | | | | 3 | | |
| Acrylic acid | | | | | 36 | 18 |
| t-Butyl peroxy-2-ethylhexanoate | 25 | 10 | 20 | | 10 | 8.2 |
| Di-t-butyl peroxide | 2.0 | 2.0 | 2.0 | | 2.0 | 2.0 |
| Solid content (%) | 90 | 50 | 90 | 50 | 90 | 50 |

Note) Monomer D is 3,4-dihydro-2H-pyran-2-yl-methyl 3,4-dihydro-2H-pyran-2-carboxylate.

| Oligomer | X1 | X2 | Y1 | Y2 | Z1 | Z2 | Z3 |
|---|---|---|---|---|---|---|---|
| Properties of oligomer | | | | | | | |
| Amount of functional group (mol/kg-resin) | | | | | | | |
| Acetoacetyl group | | | 3.0 | 1.5 | | | |
| Hydrolyzable silyl group | | | | | | | 1.0 |
| Blocked hydroxyl group | | | | | | 1.0 | 1.0 |
| Phosphoric acid group | 2.0 | 1.0 | | | | | |
| Epoxy group | | | | | 3.0 | 2.0 | 1.0 |
| Number-average molecular weight | 1100 | 8000 | 1300 | 3500 | 1500 | 3000 | 2800 |
| Starting materials | | | | | | | |
| Xylene | 675 | 250 | 675 | 250 | 675 | 250 | 250 |
| γ-Methacryloyloxypropyl trimethoxysilane | | | | | | | 62 |
| Glycidyl methacrylate | | | | | | 47 | 47 |
| Styrene | 49 | 79 | 40 | 60 | 43 | 42 | 35 |
| Butyl acrylate | 40 | 75 | 25 | 55 | 40 | 40 | 30 |
| 2-Ethylhexyl methacrylate | 40 | 40 | 25 | 55 | 30 | 30 | 30 |
| Monomer E* | 111 | 56 | | | | | |
| Acetoacetoxyethyl methacrylate | | | 160 | 80 | | | |
| Cyclomer A 200 | | | | | 137 | 91 | 46 |
| t-Butyl peroxy-2-ethylhexanoate | 25 | 5 | 22 | 9 | 12 | 15 | 25 |
| Di-t-butyl peroxide | 2.0 | 2.0 | 2.0 | 2.0 | 2.0 | 2.0 | 1.0 |
| Solid content (%) | 90 | 50 | 90 | 50 | 90 | 5.0 | 50 |

Note) Monomer E is a vinyl-polymerizable monomer having a phosphoric acid group and represented by the following structural formula:

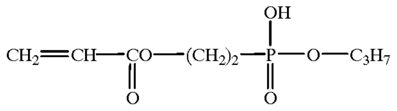

6. Preparation of Test Pieces

OTO 850 (an intercoating paint produced by Nippon Paint Co., Ltd.) was coated on an electrodeposited plate with a painting gun (Wider 77) and then baked at 140° C. for 20 minutes. The viscosty of starting materials for base coating paint was controlled to a Ford cup viscosity of 13 seconds (25° C.) with methyl isobutyl ketone/toluene/xylene (30/30/40), and then the base coating paint was coated so that the thickness of the dry coating would be 20 μm. A clear coating paint having a composition given in Table 5 and a Ford cup viscosity controlled at 25 seconds (25° C.) with xylene was coated to the base coating by wet-on-wet technique so that the thickness of the dry coating would be 30 μm and then baked at 140° C. for 20 minutes.

7. Determination of Properties of Coatings (1) Water Resistance:

The test pieces were immersed in warm water having a temperature of 60° C. and then the adhesion thereof was tested by a crosscut tape peeling test (adhesion test). The results were classified according to the following criteria:

◎: no peeling of the coating,

○: peeling in less than 5% of the area of the coating, and

X: peeling in 5% or more of the area of the coating.

(2) Adhesion:

The test pieces were crosscut and then a cellophane tape was pressed thereon and peeled off to determine the adhesion. The test results were shown by ○ which indicates that the sample was adhesive and X which indicates that it was not adhesive.

(3) Weather Resistance:

The samples were treated with an accelerated weathering tester for 3,000 hours and then the gloss retention rate of the coating was determined. The results were classified according to the following criteria:

◎: Gloss retention rate was at least 85%.

○: Gloss retention rate was 70% to less than 85%.

X: Gloss retention rate was less than 70%.

(4) Acid Resistance:

0.2 ml of a 5% aqueous sulfuric acid solution was dropped on the coating. After drying at 40° C. for 30 minutes, the state of the coating was macroscopically observed. The results were shown by X which indicates that there was some trace and ○ which indicates that there was no trace.

(5) Gasoline Resistance:

The test piece was inclined at 45 degrees. 1 ml of gasoline (Nisseki Silver) was left to flow down thereon and then left to dry in one cycle. 10 cycles were repeated and the state of the coating was macroscopically observed. The results were classified according to the following criteria:

◎: no change,

○: some swelling, discoloration and cracks, and

X: serious swelling, discoloration and cracks.

(6) Storability:

A clear coating paint having a viscosity controlled with xylene at 25 seconds (25° C.) as determined with the Ford cup was tightly sealed in a glass bottle and then left to stand in a constant temperature bath at 25° C. and 40° C. for 20 days. Thereafter, the viscosity was determined again with the Ford cup. The results were classified according to the following criteria:

◎: The viscosity as determined with the Ford cup at 25° C. was 35 seconds or below.

○: The viscosity was above 35 seconds to 45 seconds.

X: The viscosity was above 45 seconds.

The results are given in Table 5.

TABLE 5

(Wet-on-wet painting)

| Clear coating paint | a1 | a2 | b1 | b2 | b3 | b4 | b5 | b6 | b7 | b8 | c1 | c2 | d1 | d2 |
|---|---|---|---|---|---|---|---|---|---|---|---|---|---|---|
| Combination of functional groups | | | | | | | | | | | | | | |
| AA group* | | | ○ | ○ | ○ | ○ | ○ | ○ | ○ | ○ | | | | |
| Ep group* | ○ | ○ | ○ | ○ | ○ | ○ | ○ | ○ | ○ | ○ | ○ | ○ | ○ | ○ |
| BOH group* | | | ○ | ○ | ○ | ○ | ○ | ○ | ○ | ○ | | | | |
| BCa group* | | | | | | | | | | | | | ○ | ○ |
| Ca group* | ○ | ○ | | | | | | | | | | | | |
| Ph group* | | | | | | | | | | | ○ | ○ | | |
| Component | | | | | | | | | | | | | | |
| W1 | 60 | | | | | | | | | | | | | |
| W2 | | 60 | | | | | | | | | | | | |
| N1 | 30 | | | | 23 | | | | | | 30 | | 30 | |
| N2 | | 20 | | | | 20 | | | | | | 20 | | 40 |
| B1 | | | 90 | | | | | | | | | | | |
| B2 | | | | 90 | | | | | | | | | | |
| E1 | | | | | 60 | | | | | | | | | |
| E2 | | | | | | 60 | | | | | | | | |
| F1 | | | | | | | 60 | | | | | | | |
| F2 | | | | | | | | 60 | | | | | | |
| M1 | | | | | | | 30 | | | | | | | |
| M2 | | | | | | | | 30 | | | | | | |
| I1 | | | | | | | | | 70 | | | | | |
| I2 | | | | | | | | | | 70 | | | | |
| 01 | | | | | | | | | 20 | | | | | |
| 02 | | | | | | | | | | 20 | | | | |
| X1 | | | | | | | | | | | 60 | | | |
| X2 | | | | | | | | | | | | 60 | | |
| P1 | | | | | | | | | | | | | 40 | |
| P2 | | | | | | | | | | | | | | 60 |
| Sanduvor 3206 | 1 | 1 | 1 | 1 | 1 | 1 | 1 | 1 | 1 | 1 | 1 | 1 | 1 | 1 |
| Tinuvin 123 (X10) | 5 | 5 | 5 | 5 | 5 | 5 | 5 | 5 | 5 | 5 | 5 | 5 | 5 | 5 |
| KP 321 ($X10^2$) | 5 | 5 | 5 | 5 | 5 | 5 | 5 | 5 | 5 | 5 | 5 | 5 | 5 | 5 |
| Monooctyl phosphate ($X10^2$) | | | | | | | | | | | | | 5 | 5 |

TABLE 5-continued (Wet-on-wet painting)

| Base coating paint | bb1 | bb3 | bb1 | bb4 | bb2 | bb5 | bb1 | bb6 | bb2 | bb7 | bb2 | bb8 | bb2 | bb9 |
|---|---|---|---|---|---|---|---|---|---|---|---|---|---|---|
| Results of property tests | | | | | | | | | | | | | | |
| Water resistance | ○ | ○ | ○ | ○ | ○ | ○ | ○ | ○ | ○ | ○ | ○ | ○ | ○ | ○ |
| Gasoline resistance | ○ | ○ | ◎ | ◎ | ◎ | ◎ | ◎ | ◎ | ◎ | ◎ | ○ | ○ | ◎ | ◎ |
| Adhesion | ○ | ○ | ○ | ○ | ○ | ○ | ○ | ○ | ○ | ○ | ○ | ○ | ○ | ○ |
| Weather resistance | ○ | ○ | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ | ○ | ○ |
| Storability | | | | | | | | | | | | | | |
| 25° C. | ◎ | ◎ | ◎ | ◎ | ◎ | ◎ | ◎ | ◎ | ◎ | ◎ | ◎ | ◎ | ◎ | ◎ |
| 40° C. | ○ | ○ | ◎ | ◎ | ◎ | ◎ | ◎ | ◎ | ◎ | ◎ | ○ | ○ | ◎ | ◎ |

Notes)
AA group: acid anhydride group,
Ep group: epoxy group,
BOH group: blocked hydroxyl group,
BCa group: blocked carboxyl group, and
Ca group: carboxyl group.

| Clear coating paint | d3 | d4 | e1 | e2 | e3 | e4 | f1 | f2 | f3 | f4 | f5 | f6 | f7 | f8 |
|---|---|---|---|---|---|---|---|---|---|---|---|---|---|---|
| Combination of functional groups | | | | | | | | | | | | | | |
| Si group* | | | | | | | ○ | ○ | ○ | ○ | ○ | ○ | ○ | ○ |
| AA group | | | | | | | ○ | ○ | ○ | ○ | ○ | ○ | ○ | ○ |
| Ep group | ○ | ○ | ○ | ○ | ○ | ○ | ○ | ○ | ○ | ○ | ○ | ○ | ○ | ○ |
| BOH group | | | | | | | ○ | ○ | ○ | ○ | ○ | ○ | ○ | ○ |
| BCa group | ○ | ○ | | | | | | | | | | | | |
| BPh group* | | | ○ | ○ | ○ | ○ | | | | | | | | |
| Component | | | | | | | | | | | | | | |
| Q1 | 90 | | | | | | | | | | | | | |
| Q2 | | 90 | | | | | | | | | | | | |
| N1 | | | 30 | | | | | | | | 20 | | | |
| N2 | | | | 40 | | | | | | | | 10 | | |
| T1 | | | 40 | | | | | | | | | | | |
| T2 | | | | 60 | | | | | | | | | | |
| U1 | | | | | 90 | | | | | | | | | |
| U2 | | | | | | 90 | | | | | | | | |
| A1 | | | | | | | 90 | | | | | | | |
| A2 | | | | | | | | 90 | | | | | | |
| B1 | | | | | | | | | 80 | | | | | |
| B2 | | | | | | | | | | 70 | | | | |
| L1 | | | | | | | | | 10 | | | | | |
| L2 | | | | | | | | | | 20 | | | | |
| C1 | | | | | | | | | | | 80 | | | |
| C2 | | | | | | | | | | | | 60 | | |
| D1 | | | | | | | | | | | | | 60 | |
| D2 | | | | | | | | | | | | | | 60 |
| M1 | | | | | | | | | | | | | 20 | |
| M2 | | | | | | | | | | | | | | 21 |
| Sanduvor 3206 | 1 | 1 | 1 | 1 | 1 | 1 | 1 | 1 | 1 | 1 | 1 | 1 | 1 | 1 |
| Tinuvin 123 (X10) | 5 | 5 | 5 | 5 | 5 | 5 | 5 | 5 | 5 | 5 | 5 | 5 | 5 | 5 |
| KP 321 ($X10^2$) | 5 | 5 | 5 | 5 | 5 | 5 | 5 | 5 | 5 | 5 | 5 | 5 | 5 | 5 |
| Monooctyl phosphate ($X10^2$) | 5 | 5 | 5 | 5 | 5 | 5 | | | | | | | | |

| Base coat paint | bb 2 | bb 10 | bb 2 | bb 11 | bb 2 | bb 12 | bb 2 | bb 13 | bb 1 | bb 14 | bb 2 | bb 3 | bb 2 | bb 3 |
|---|---|---|---|---|---|---|---|---|---|---|---|---|---|---|
| Results of property tests | | | | | | | | | | | | | | |
| Water resistance | ○ | ○ | ○ | ○ | ○ | ○ | ○ | ○ | ○ | ○ | ○ | ○ | ○ | ○ |
| Gasoline resistance | ◎ | ◎ | ◎ | ◎ | ◎ | ◎ | ◎ | ◎ | ◎ | ◎ | ◎ | ◎ | ◎ | ◎ |
| Adhesion | ○ | ○ | ○ | ○ | ○ | ○ | ○ | ○ | ○ | ○ | ○ | ○ | ○ | ○ |
| Weather resistance | ○ | ○ | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ | ○ | ○ |

TABLE 5-continued (Wet-on-wet painting)

| | | | | | | | | | | | | | | |
|---|---|---|---|---|---|---|---|---|---|---|---|---|---|---|
| Storability | | | | | | | | | | | | | | |
| 25° C. | ◎ | ◎ | ◎ | ◎ | ◎ | ◎ | ◎ | ◎ | ◎ | ◎ | ◎ | ◎ | ◎ | ◎ |
| 40° C. | ◎ | ◎ | ◎ | ◎ | ◎ | ◎ | ◎ | ◎ | ◎ | ◎ | ◎ | ◎ | ◎ | ◎ |

Notes)
Si group: hydrolyzable silyl group, and
BPh group: blocked phosphoric acid group.

| Clear coating paint | f9 | f10 | f11 | f12 | f13 | f14 | f15 | f16 | f17 | f18 | g1 | g2 | h1 | h2 |
|---|---|---|---|---|---|---|---|---|---|---|---|---|---|---|
| Combination of functional groups | | | | | | | | | | | | | | |
| Si group* | ○ | ○ | ○ | ○ | ○ | ○ | ○ | ○ | ○ | ○ | | | | |
| AA group | ○ | ○ | ○ | ○ | ○ | ○ | ○ | ○ | ○ | ○ | | | | |
| Ep group | ○ | ○ | ○ | ○ | ○ | ○ | ○ | ○ | ○ | ○ | | | | |
| BOH group | ○ | ○ | ○ | ○ | ○ | ○ | ○ | ○ | ○ | ○ | | | | |
| BCa group | | | | | | | | | | | | | ○ | ○ |
| Vinyl ether group | | | | | | | | | | | ○ | ○ | ○ | ○ |
| Acetoacetyl group | | | | | | | | | | | ○ | ○ | | |
| Component | | | | | | | | | | | | | | |
| E1 | 45 | | | | | | | | | | | | | |
| E2 | | 45 | | | | | | | | | | | | |
| K1 | 45 | | | | | | | | | | | | | |
| K2 | | 45 | | | | | | | | | | | | |
| F1 | | | 45 | | | | | | | | | | | |
| F2 | | | | 45 | | | | | | | | | | |
| J1 | | | 45 | | | | | | | | | | | |
| J2 | | | | 45 | | | | | | | | | | |
| G1 | | | | | 80 | | | | | | | | | |
| G2 | | | | | | 80 | | | | | | | | |
| 01 | | | | | 10 | | | | 20 | | | | | |
| 02 | | | | | | 10 | | | | 20 | | | | |
| H1 | | | | | | | 30 | | | | | | | |
| H2 | | | | | | | | 30 | | | | | | |
| I1 | | | | | | | 60 | | | | | | | |
| I2 | | | | | | | | 60 | | | | | | |
| L1 | | | | | | | | | 20 | | | | | |
| L2 | | | | | | | | | | 20 | | | | |
| M1 | | | | | | | | | 40 | | | | | |
| M2 | | | | | | | | | | 30 | | | | |
| N1 | | | | | | | | | 30 | | | | | |
| N2 | | | | | | | | | | 20 | | | | |
| Sanduvor 3206 | 1 | 1 | 1 | 1 | 1 | 1 | 1 | 1 | 1 | 1 | 1 | 1 | 1 | 1 |
| Tinuvin 123 (X10) | 5 | 5 | 5 | 5 | 5 | 5 | 5 | 5 | 5 | 5 | 5 | 5 | 5 | 5 |
| KP 321 ($X10^2$) | 5 | 5 | 5 | 5 | 5 | 5 | 5 | 5 | 5 | 5 | 5 | 5 | 5 | 5 |
| Y1 | | | | | | | | | | | 60 | | | |
| Y2 | | | | | | | | | | | | 75 | | |
| V1 | | | | | | | | | | | 40 | | 40 | |
| V2 | | | | | | | | | | | | 15 | | 20 |
| P1 | | | | | | | | | | | | | 60 | |
| P2 | | | | | | | | | | | | | | 75 |
| Base coating paint | bb2 | bb3 | bb2 | bb3 | bb3 | bb5 | bb1 | bb5 | bb1 | bb5 | bc1 | bc3 | bc2 | bc4 |
| Results of property tests | | | | | | | | | | | | | | |
| Water resistance | ○ | ○ | ○ | ○ | ○ | ○ | ○ | ○ | ○ | ○ | ○ | ○ | ○ | ○ |
| Gasoline resistance | ◎ | ◎ | ◎ | ◎ | ◎ | ◎ | ◎ | ◎ | ◎ | ◎ | ◎ | ◎ | ◎ | ◎ |
| Adhesion | ○ | ○ | ○ | ○ | ○ | ○ | ○ | ○ | ○ | ○ | ○ | ○ | ○ | ○ |
| Weather resistance | ○ | ○ | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ | ○ | ○ |
| Storability | | | | | | | | | | | | | | |
| 25° C. | ◎ | ◎ | ◎ | ◎ | ◎ | ◎ | ◎ | ◎ | ◎ | ◎ | ◎ | ◎ | ◎ | ◎ |
| 40° C. | ◎ | ◎ | ◎ | ◎ | ◎ | ◎ | ◎ | ◎ | ◎ | ◎ | ◎ | ◎ | ◎ | ◎ |

TABLE 5-continued (Wet-on-wet painting)

| Clear coating paint | i1 | i2 | j1 | j2 | m1 | m2 | m3 |
|---|---|---|---|---|---|---|---|
| Combination of functional groups | | | | | | | |
| Si group | ○ | ○ | | | | | ○ |
| BOH group | | | | | | ○ | ○ |
| BPh group | | | ○ | ○ | | | |
| Vinyl ether group | | | ○ | ○ | | | |
| Alicyclic epoxy group | | | | | ○ | ○ | ○ |
| Component | | | | | | | |
| L1 | 90 | | | | | | |
| L2 | | 90 | | | | | |
| P1 | | | 40 | | | | |
| P2 | | | | 78 | | | |
| V1 | | | 60 | | | | |
| V2 | | | | 20 | | | |
| Z1 | | | | | 80 | | |
| Z2 | | | | | | 80 | |
| Z3 | | | | | | | 80 |
| Sanduvor 3206 | 1 | 1 | 1 | 1 | 1 | 1 | 1 |
| Tinuvin 123 (X10) | 5 | 5 | 5 | 5 | 5 | 5 | 5 |
| KP 321 ($X10^2$) | 5 | 5 | 5 | 5 | 5 | 5 | 5 |
| Monooctyl phosphate | | | | | 0.05 | 0.05 | |
| Base coating paint | bb 12 | bc 5 | bc 6 | bc 7 | bc 13 | bc 13 | bc 14 |
| Results of property tests | | | | | | | |
| Water resistance | ○ | ○ | ○ | ○ | ○ | ○ | ○ |
| Gasoline resistance | ◎ | ◎ | ◎ | ◎ | ◎ | ◎ | ◎ |
| Adhesion | ○ | ○ | ○ | ○ | ○ | ○ | ○ |
| Weather resistance | ○ | ○ | ○ | ○ | ○ | ○ | ○ |
| Acid resistance | ○ | ○ | ○ | ○ | ○ | ○ | ○ |
| Storability | | | | | | | |
| 25° C. | ◎ | ◎ | ◎ | ◎ | ◎ | ◎ | ◎ |
| 40° C. | ◎ | ◎ | ◎ | ◎ | ◎ | ◎ | ◎ |

Comparative Examples

| Clear coating paint | n1 | n2 | n3 | n4 | n5 | n6 | n7 | n8 | n9 | n10 | n11 | n12 | n13 | n14 |
|---|---|---|---|---|---|---|---|---|---|---|---|---|---|---|
| Combination of functional groups | | | | | | | | | | | | | | |
| AA group | | | ○ | ○ | ○ | ○ | ○ | ○ | ○ | ○ | | | | |
| Ep group | ○ | ○ | ○ | ○ | ○ | ○ | ○ | ○ | ○ | ○ | ○ | ○ | ○ | ○ |
| BOH group | | | ○ | ○ | ○ | ○ | ○ | ○ | ○ | ○ | | | | |
| BCa group | | | | | | | | | | | | | ○ | ○ |
| Ca group | ○ | ○ | | | | | | | | | | | | |
| Ph group | | | | | | | | | | | ○ | ○ | | |
| Component | | | | | | | | | | | | | | |
| W1 | 60 | | | | | | | | | | | | | |
| W2 | | 60 | | | | | | | | | | | | |
| N1 | 30 | | | | 23 | | | | | | 30 | | 30 | |
| N2 | | 20 | | | | 20 | | | | | | 20 | | 40 |
| B1 | | | 90 | | | | | | | | | | | |
| B2 | | | | 90 | | | | | | | | | | |
| E1 | | | | | 60 | | | | | | | | | |
| E2 | | | | | | 60 | | | | | | | | |
| F1 | | | | | | | 60 | | | | | | | |
| F2 | | | | | | | | 60 | | | | | | |
| M1 | | | | | | | 30 | | | | | | | |
| M2 | | | | | | | | 30 | | | | | | |
| I1 | | | | | | | | | 70 | | | | | |
| I2 | | | | | | | | | | 70 | | | | |
| 01 | | | | | | | | | 20 | | | | | |
| 02 | | | | | | | | | | 20 | | | | |
| X1 | | | | | | | | | | | 60 | | | |
| X2 | | | | | | | | | | | | 60 | | |

TABLE 5-continued

| (Wet-on-wet painting) | | | | | | | | | | | | | | |
|---|---|---|---|---|---|---|---|---|---|---|---|---|---|---|
| P1 | | | | | | | | | | | | | 40 | |
| P2 | | | | | | | | | | | | | | 60 |
| Sanduvor 3206 | 1 | 1 | 1 | 1 | 1 | 1 | 1 | 1 | 1 | 1 | 1 | 1 | 1 | 1 |
| Sanduvor 3058(X10) | 5 | 5 | 5 | 5 | 5 | 5 | 5 | 5 | 5 | 5 | 5 | 5 | 5 | 5 |
| KP 321 ($X10^2$) | 5 | 5 | 5 | 5 | 5 | 5 | 5 | 5 | 5 | 5 | 5 | 5 | 5 | 5 |
| Trilaurylmethyl-ammonium acetate | | | | | | | | | 3 | | | | | |
| Base coating paint | Hb1 | Hb3 | Hb2 | Hb4 | Hb1 | Hb3 | Hb1 | Hb3 | Hd1 | Hd2 | Hb1 | Hb3 | Hb2 | Hb4 |
| Results of property tests | | | | | | | | | | | | | | |
| Water resistance | X | X | X | X | X | X | X | X | ○ | X | X | X | X | X |
| Gasoline resistance | X | X | X | X | X | X | X | X | ◎ | X | X | X | X | X |
| Adhesion | ○ | ○ | ○ | ○ | ○ | ○ | ○ | ○ | ○ | X | ○ | ○ | ○ | ○ |
| Weather resistance | X | X | X | X | X | X | X | X | ○ | X | X | X | X | X |
| Acid resistance | X | ○ | ○ | X | X | ○ | X | ○ | ○ | X | X | ○ | ○ | X |
| Storability | | | | | | | | | | | | | | |
| 25° C. | ◎ | ◎ | ◎ | ◎ | ◎ | ◎ | ◎ | ◎ | X | ◎ | ◎ | ◎ | ◎ | ◎ |
| 40° C. | ○ | ○ | ◎ | ◎ | ◎ | ◎ | ◎ | ◎ | X | ◎ | ○ | ○ | ◎ | ◎ |
| Clear coating paint | 15 | n16 | n17 | n18 | n19 | n20 | n21 | n22 | n23 | n24 | n25 | n26 | n27 | n28 |
| Combination of functional groups | | | | | | | | | | | | | | |
| Si group | | | | | | | ○ | ○ | ○ | ○ | ○ | ○ | ○ | ○ |
| AA group | | | | | | | ○ | ○ | ○ | ○ | ○ | ○ | ○ | ○ |
| Ep group | ○ | ○ | ○ | ○ | ○ | ○ | ○ | ○ | ○ | ○ | ○ | ○ | ○ | ○ |
| BOH group | | | | | | | ○ | ○ | ○ | ○ | ○ | ○ | ○ | ○ |
| BCa group | ○ | ○ | | | | | | | | | | | | |
| BPh group | | | ○ | ○ | ○ | ○ | | | | | | | | |
| Component | | | | | | | | | | | | | | |
| Q1 | 90 | | | | | | | | | | | | | |
| Q2 | | 90 | | | | | | | | | | | | |
| N1 | | | 30 | | | | | | | | 20 | | | |
| N2 | | | | 40 | | | | | | | | 10 | | |
| T1 | | | 40 | | | | | | | | | | | |
| T2 | | | | 60 | | | | | | | | | | |
| U1 | | | | | 90 | | | | | | | | | |
| U2 | | | | | | 90 | | | | | | | | |
| A1 | | | | | | | 90 | | | | | | | |
| A2 | | | | | | | | 90 | | | | | | |
| B1 | | | | | | | | | 80 | | | | | |
| B2 | | | | | | | | | | 70 | | | | |
| L1 | | | | | | | | | 10 | | | | | |
| L2 | | | | | | | | | | 20 | | | | |
| C1 | | | | | | | | | | | 80 | | | |
| C2 | | | | | | | | | | | | 60 | | |
| D1 | | | | | | | | | | | | | 60 | |
| D2 | | | | | | | | | | | | | | 60 |
| M1 | | | | | | | | | | | | | 20 | |
| M2 | | | | | | | | | | | | | | 21 |
| Sanduvor 3206 | 1 | 1 | 1 | 1 | 1 | 1 | 1 | 1 | 1 | 1 | 1 | 1 | 1 | 1 |
| Sanduvor 3058(X10) | 5 | 5 | 5 | 5 | 5 | 5 | 5 | 5 | 5 | 5 | 5 | 5 | 5 | 5 |
| KP 321 ($X10^2$) | 5 | 5 | 5 | 5 | 5 | 5 | 5 | 5 | 5 | 5 | 5 | 5 | 5 | 5 |
| Tetrabutyl phosphonium bromide | | 3 | | | 3 | | | | | | | 3 | | |
| Base coating paint | Hd1 | Hd2 | Hb1 | Hb3 | Hd1 | Hd2 | Hb1 | Hb3 | Hb2 | Hb4 | Hd1 | Hd2 | Hb1 | Hb3 |
| Results of property tests | | | | | | | | | | | | | | |
| Water resistance | X | ○ | X | X | ○ | X | X | X | X | X | X | ○ | X | X |
| Gasoline resistance | X | ◎ | X | X | ◎ | X | X | X | X | X | X | ◎ | X | X |
| Adhesion | X | ○ | ○ | ○ | ○ | X | ○ | ○ | ○ | ○ | X | ○ | ○ | ○ |
| Weather | X | ○ | X | X | ○ | X | X | X | X | X | X | ○ | X | X |

TABLE 5-continued

| (Wet-on-wet painting) | | | | | | | | | | | | | | |
|---|---|---|---|---|---|---|---|---|---|---|---|---|---|---|
| resistance | | | | | | | | | | | | | | |
| Acid resistance | X | ○ | X | ○ | ○ | X | X | ○ | ○ | X | X | ○ | X | ○ |
| Storability | | | | | | | | | | | | | | |
| 25° C. | ◎ | X | ◎ | ◎ | X | ◎ | ◎ | ◎ | ◎ | ◎ | ◎ | X | ◎ | ◎ |
| 40° C. | ◎ | X | ◎ | ◎ | X | ◎ | ◎ | ◎ | ◎ | ◎ | ◎ | X | ◎ | ◎ |

| Clear coating paint | n29 | n30 | n31 | n32 | n33 | n34 | n35 | n36 | n37 |
|---|---|---|---|---|---|---|---|---|---|
| Combination of functional groups | | | | | | | | | |
| Si group | | | | | ○ | ○ | | | ○ |
| BPh group | | | ○ | ○ | | | ○ | ○ | |
| Vinyl ether group | ○ | ○ | ○ | ○ | | | | | |
| Acetoacetyl group | ○ | ○ | | | | | | | |
| Ep group | | | | | | | | | ○ |
| Alicyclic epoxy group | | | | | | | | | ○ |
| Component | | | | | | | | | |
| K1 | 30 | | 30 | | | | | | |
| K2 | | 20 | | 40 | | | | | |
| L1 | | | | | 90 | | | | |
| L2 | | | | | | 90 | | | |
| P1 | | | | | | | 40 | | |
| P2 | | | | | | | | 78 | |
| V1 | | | | | | | 60 | | |
| V2 | | | | | | | | 20 | |
| Z3 | | | | | | | | | 80 |
| Sanduvor 3206 | 1 | 1 | 1 | 1 | 1 | 1 | 1 | 1 | 1 |
| Tinuvin 123 (X10) | 5 | 5 | 5 | 5 | 5 | 5 | 5 | 5 | 5 |
| KP 321 (X$10^2$) | 5 | 5 | 5 | 5 | 5 | 5 | 5 | 5 | 5 |
| Trisacetyl-acetonatoaluminum | | | | | | | | | 3 |
| Y1 | 60 | | | | | | | | |
| Y2 | | 75 | | | | | | | |
| V1 | 40 | | 40 | | | | | | |
| V2 | | 15 | | 20 | | | | | |
| P1 | | | 60 | | | | | | |
| P2 | | | | 75 | | | | | |
| Base coating paint | Hc1 | Hc3 | Hc2 | Hc4 | Hc1 | Hc3 | Hc1 | Hc3 | Hc3 |
| Results of property tests | | | | | | | | | |
| Water resistance | ○ | ○ | ○ | ○ | ○ | ○ | ○ | ○ | ○ |
| Gasoline resistance | X | X | X | X | X | X | X | X | X |
| Adhesion | ○ | ○ | ○ | ○ | ○ | ○ | ○ | ○ | ○ |
| Weather resistance | ○ | ○ | ○ | ○ | ○ | ○ | ○ | ○ | ○ |
| Acid resistance | ○ | ○ | ○ | ○ | ○ | ○ | ○ | ○ | ○ |
| Storability | | | | | | | | | |
| 25° C. | ◎ | ◎ | ◎ | ◎ | ◎ | ◎ | ◎ | ◎ | ◎ |
| 40° C. | ◎ | ◎ | ◎ | ◎ | ◎ | ◎ | ◎ | ◎ | ◎ |

It will be apparent from the results given above that, when a curing catalyst having a boiling point of 150° C. or higher under 760 mmHg, which is to be used for a clear coating paint of a curing system different from that for a base coating paint, is incorporated into the base coating paint, the storability of the clear coating paint per se becomes excellent and the resultant coating formed by coating the clear coating paint on the base coating paint by the wet-on-wet technique and baking the coating is also excellent. It will be also apparent, on the other hand, from Comparative Examples that, when the boiling point of the curing catalyst for the clear coating paint which is incorporated into the base coating paint is below 150° C., when the curing catalyst is incorporated into the clear coating paint but not into the base coating paint, or when the curing catalyst is incorporated into neither base coating paint nor clear coating paint, the storability is reduced or, even though the storability is not reduced, the properties of the resultant coating, such as gasoline resistance, water resistance and acid resistance are seriously reduced.

What is claimed is:

1. A base coating paint composition comprising a hydroxy group-containing oligomer and an aminoplast resin which together are curable upon being subjected to heat, said composition further containing a basic curing catalyst having a boiling point of 150° C. or higher under 760 mm Hg and a molecular weight of from about 100 to about 400, wherein said basic curing catalyst has no function of accelerating the reaction between said hydroxy group-containing oligomer and said aminoplast resin during curing thereof, and wherein said basic curing catalyst is present in said base coating paint composition for the purpose of acting as a curing catalyst for a clear coating paint to be coated in a wet-on-wet state on said base coating paint composition, with the two coatings being subsequently baked, and with said basic curing catalyst contained in said base coating paint migrating into said clear coating paint and functioning as a basic curing catalyst to effect curing of the clear coating paint during the baking.

2. The base coating paint of claim 1, wherein said curing catalyst has a boiling point of 180° C. or higher.

3. The base coating paint of claim 2, wherein said basic curing catalyst is selected from the group consisting of a tertiary amine compound, an amide compound, a quaternary ammonium compound and a quaternary phosphonium compound.

4. The base coating paint of claim 3, wherein said tertiary amine compound is represented by the formula:

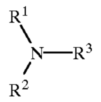

wherein $R^1$, $R^2$ and $R^3$ independently represent an alkyl or aryl group, or $R^2$ and $R^3$ may form together a tertiary amine compound having a five-membered or six-membered ring together with the nitrogen atom bonded therewith.

5. The base coating paint of claim 3, wherein said tertiary amine compound is selected from the group consisting of tributylamine, tripropylamine, trioctylamine, N,N-dimethylhexylamine, N,N-diethylbenzylamine, N,N-dimethylaniline, N,N-diethylaniline, N,N-dipentylaniline, N,N-dimethylnaphthylamine, N,N-dimethyl-o-toluidene, N,N-dimethyl-m-toluidine, N,N-dimethyl-p-toluidine, N,N-diphenylmethylamine, N,N-diphenylethylamine, N,N,N',N'-tetramethyl-o-phenylenediamine, N,N,N',N'-tertramethyl-m-phenylenediamine, 2,3-dimethylpyridine, 2,4-dimethylpyridine, 3,4-dimethylpyridine, 2-benzylpyridine, 3-benzylpyridine, 4-benzylpyridine, 2-phenylpyridine, 2-chloropyridine, 2-vinylpyridine, pyrazine, 2,5-dimethylpyrazine, N-methyl-2-pyrrolidone and 1-methylimidazole.

6. The base coating paint of claim 3, wherein said amide compound is represented by the formula:

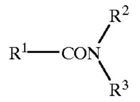

wherein $R^1$, $R^2$ and $R^3$ independently represent a hydrogen atom, an alkyl group or an aryl group.

7. The base coating paint of claim 1, wherein said basic curing catalyst is used in an amount of 5 to 100 m mol, per 100 parts of the solid resin content of said base coating paint.

8. The base coating paint composition of claim 1 wherein an acidic curing catalyst is also included in combination with said hydroxy group-containing oligomer and said aminoplast resin for accelerating the curing reaction therebetween.

9. The base coating paint composition of claim 8 wherein said acidic curing catalyst is selected from the group consisting of strong acid catalysts and weak acid catalysts.

10. The base coating paint composition of claim 1 wherein said hydroxy group-containing oligomer also contains an acidic group.

11. A combination of a base coating paint and a clear coating paint to be successively applied to a substrate in a wet-on-wet state, said base coating paint comprising a hydroxy group-containing oligomer and an aminoplast resin which together are curable upon being subjected to heat, said base coating paint further containing a basic curing catalyst having a boiling point of 150° C. or higher under 760 mm Hg and a molecular weight of from about 100 to about 400, said clear coating paint comprising one or more oligomers having one or more functional groups that can be cured and which curing is catalyzed by the basic curing catalyst contained in said base coating paint, said basic curing catalyst having no function of accelerating the reaction between said hydroxy group-containing oligomer and said aminoplast resin of said base coating paint during curing thereof, and wherein said basic curing catalyst's presence in said base coating paint is for the purpose of acting as a curing catalyst for said clear coating paint, said clear coating paint to be coated in a wet-on-wet state on said base coating paint, with the two coatings being subsequently baked, during which said basic curing catalyst contained in said base coating paint migrates into said clear coating paint to function as a basic curing catalyst to effect curing of the clear coating paint during the baking.

12. The combination of claim 11 wherein said clear coating paint comprises an oligomer having a blocked hydroxy group, a blocked carboxyl group or a blocked phosphoric acid group.

* * * * *